(12) United States Patent
Leirens et al.

(10) Patent No.: US 11,764,691 B2
(45) Date of Patent: Sep. 19, 2023

(54) SWITCHED-MODE CONVERTER CONTROL

(71) Applicants: Commissariat à l'Energie Atomique et aux Energies Alternatives, Paris (FR); RENAULT SAS, Boulogne Billancourt (FR)

(72) Inventors: Sylvain Leirens, Grenoble (FR); Xavier Maynard, Grenoble (FR); Serge Loudot, Villiers le Bacle (FR)

(73) Assignees: Commissariat à l'Energie Atomique et aux Energies Alternatives, Paris (FR); RENAULT SAS, Boulogne Billancourt (FR)

( * ) Notice: Subject to any disclaimer, the term of this patent is extended or adjusted under 35 U.S.C. 154(b) by 58 days.

(21) Appl. No.: 17/302,908

(22) Filed: May 14, 2021

(65) Prior Publication Data
US 2021/0359609 A1    Nov. 18, 2021

(30) Foreign Application Priority Data
May 15, 2020   (FR) ...................................... 2004858

(51) Int. Cl.
*H02M 3/335*     (2006.01)
*H02M 7/219*     (2006.01)
(Continued)

(52) U.S. Cl.
CPC ... *H02M 3/33573* (2021.05); *H02M 3/33584* (2013.01); *H02M 7/219* (2013.01);
(Continued)

(58) Field of Classification Search
CPC ............. H02M 3/335; H02M 3/33569; H02M 3/33573; H02M 3/33584; H02M 7/219; H02M 1/0058; H02M 1/42; H02M 1/083
See application file for complete search history.

(56) References Cited

U.S. PATENT DOCUMENTS

2011/0249472 A1    10/2011   Jain et al.
2021/0135581 A1*   5/2021    Rajashekara ....... H02M 1/4241

OTHER PUBLICATIONS

Y. Li, A. Junyent-Ferré and P. D. Judge, "A Boost-Full-Bridge-Type Single-Active-Bridge Isolated AC-DC Converter," 2019 IEEE Applied Power Electronics Conference and Exposition (APEC), 2019, pp. 2021-2028, doi: 10.1109/APEC.2019.8722294. (Year: 2019).*
(Continued)

*Primary Examiner* — Gary L Laxton
(74) *Attorney, Agent, or Firm* — Moreno IP Law LLC

(57) ABSTRACT

The present description concerns a method of controlling a converter including two H bridges (110, 12) coupled by a transformer (130), wherein: two switching sequences between states are respectively applied to the two bridges; one of the states of a first one of the sequences corresponds to a given direction of application of a voltage to the transformer by the bridge having the first one of the sequences applied thereto; the first one of the sequences varies during a same halfwave of an AC voltage (V1) across one of the bridges (110), so that: during at least a first period, switchings into and out of said one of the states occur in a same state of a second one of the sequences; and during at least a second period, switchings into and out of said one of the states occur in different states of the second one of the sequences.

16 Claims, 15 Drawing Sheets

(51) Int. Cl.
    *H02M 1/00*     (2006.01)
    *H02M 1/08*     (2006.01)
    *H02M 1/42*     (2007.01)

(52) U.S. Cl.
    CPC .......... *H02M 1/0058* (2021.05); *H02M 1/083* (2013.01); *H02M 1/42* (2013.01)

(56) References Cited

OTHER PUBLICATIONS

Preliminary Search Report in French Application No. 2004858 dated Nov. 30, 2020, 3 pages.
F. Jauch et al, "Single-Phase Single-Stage Bidirectional Isolated ZVS AC-DC Converter with PFC," 15th International Power Electronics and Motion Control Conference, Sep. 4, 2012, 8 pages.
J. Saha et al., "A Review on Bidirectional Matrix-Based AC-DC Conversion for Modular Solid-State-Transformers," IEEE 4th International Future Energy Electronics Conference, Nov. 25, 2019, 8 pages.
T. Chen et al., "A Single-Stage Bidirectional Dual-Active-Bridge AC-DC Converter Based on Enhancement Mode GaN Power Transistor," IEEE Applied Power Electronics Conference and Exposition, Mar. 4, 2018, 6 pages.

* cited by examiner

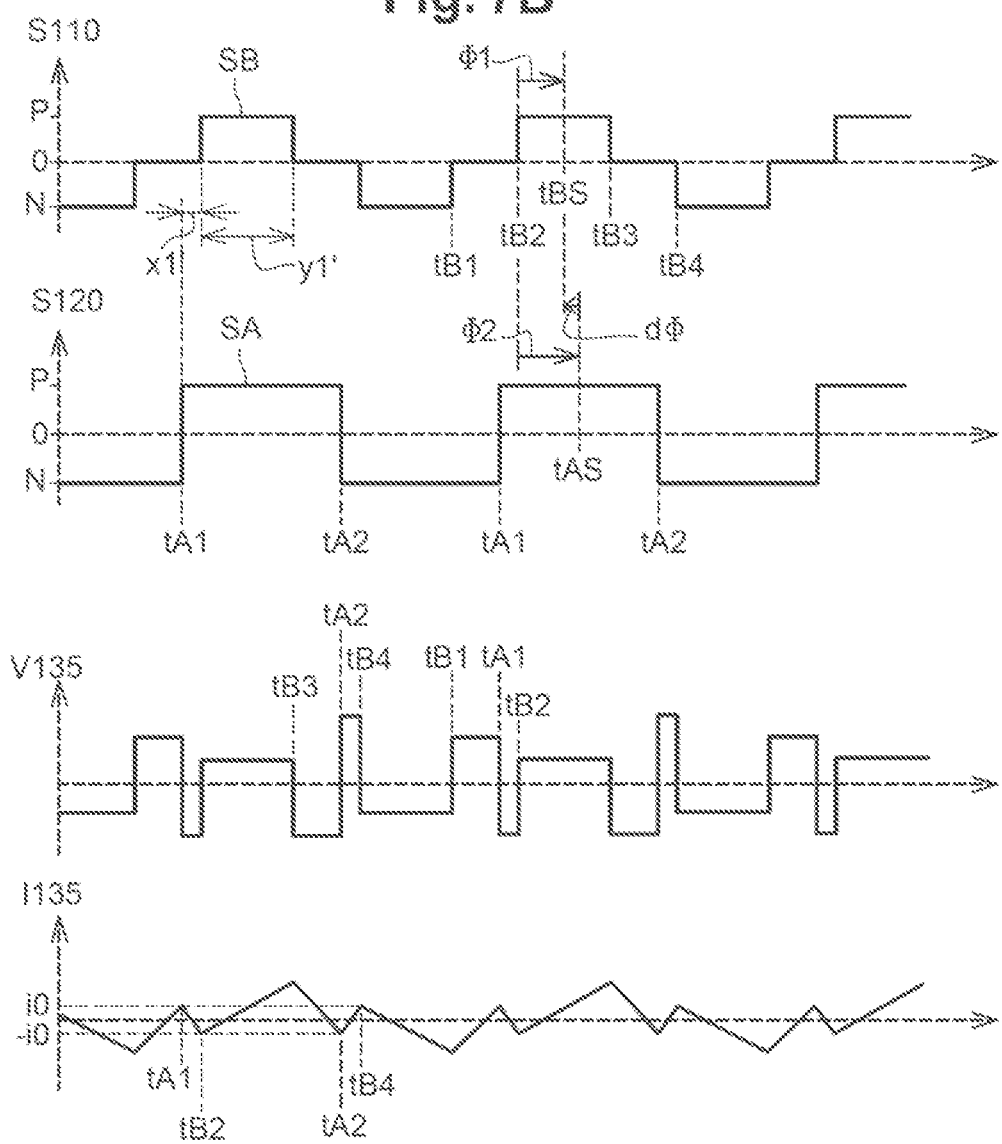

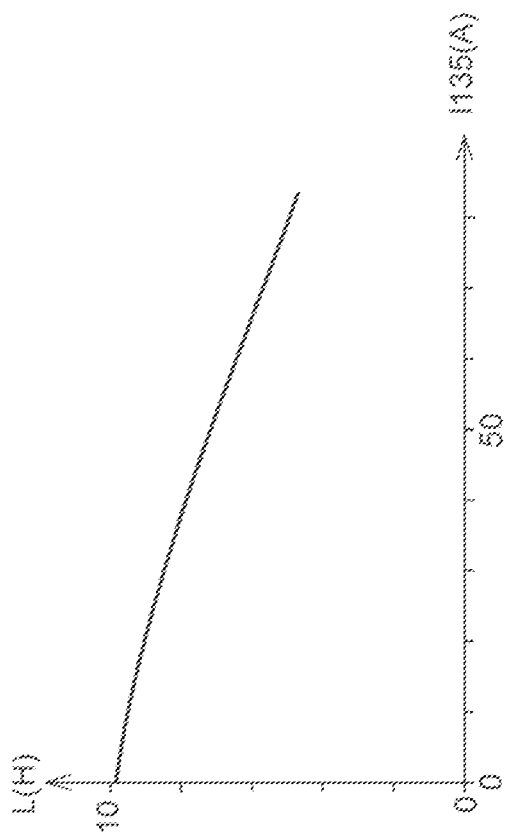

SWITCHED-MODE CONVERTER CONTROL

FIELD

The present disclosure generally concerns electronic devices, in particular switched-mode converters.

BACKGROUND

Switched-mode converters use one or a plurality of switches alternately set to the on and off states at a switching frequency. Switched-mode converters are used to deliver a voltage and/or a current from a power supply having voltage/current values different from the values of the voltage/current to be supplied. For example, an AC/DC (alternating current-direct current) switched-mode converter enables to obtain a DC voltage from a source of an AC voltage such as that of an electric network or of an alternator.

Document XP032312081 (Jauch at al.) describes an isolated, monophase, single-stage, voltage zero voltage detection bidirectional AC/DC converter with power factor correction.

Document XP033727948 (Saha et al.) describes a bidirectional array structure AC/DC conversion for modular integrated transformers.

Document US2011/0249472 describes the pulse-width modulation control of dual active bridge converters.

Document XP33347327 (Chen et al.) describes a single-stage AC/DC converter with a bidirectional dual active bridge based on enhancement GaN power transistors.

SUMMARY

There is a need to simplify known methods of switched-mode converter control, more particularly, of switched-mode converter switch control.

There is a need for a converter switch control method enabling the converter to ensure a power factor corrector function PFC improved with respect to existing power factor correctors.

An embodiment overcomes all or part of the disadvantages of known switched-mode converter control methods.

An embodiment overcomes all or part of the disadvantages of known switched-mode converter control devices.

An embodiment overcomes all or part of the disadvantages of known switched-mode converters.

According to a first aspect, an embodiment provides a method of controlling a converter comprising two H bridges coupled by a transformer, wherein:
repetitions of two switching sequences between a plurality of states are respectively applied to the two bridges; and
the two sequences are generated from a same value representative of an interval between switching times of the two sequences:
for a value of a ratio between voltages across the two bridges greater than a transformation ratio of the transformer; and
for a value of the ratio between voltages smaller than the transformation ratio.

According to an embodiment, the switching times of the sequences are calculated from a set point representative of a power to be transferred between the bridges, and the two sequences are generated from said same representative value for same values of a ratio of said set point to a product of said voltages.

According to an embodiment:
the set point is calculated according to a value of a voltage received by one of the bridges; an
preferably, the received voltage is an AC voltage and the set point is calculated so that the converter has a PFC-type operation.

According to an embodiment, said switching times result from calculations based on an equality between:
the power represented by the set point; and
a power calculated from a model of the converter and based on values of the voltages across the bridges.

According to an embodiment, said calculations are further based on a desired equality between values of a current in the transformer at a switching time of one of the two sequences and at a switching time of the other one of the two sequences.

According to an embodiment, for each of said calculations, a frequency common to said repetitions is selected prior to the calculation.

According to an embodiment, in each of the sequences, switchings into and out of a given state are located symmetrically with respect to a reference time, the reference times of the two sequences having between each other a phase shift.

According to an embodiment, the sequences are generated based on opposite desired values of said phase shifts for values inverse to each other of a ratio of the ratio between voltages to the transformation ratio.

According to an embodiment, said phase shift has opposite signs for two opposite energy flow directions between the bridges.

According to an embodiment:
the two sequences each comprise two respective switching cycles of two branches of the bridge having the sequence applied thereto;
the cycles of a first one of the two sequences are phase-shifted with respect to each other; and
the cycles of a second one of the two sequences are inverse to each other.

According to an embodiment, the cycles of the first and/or second one of the two sequences have a duty cycle substantially equal to 0.5.

According to an embodiment, the voltages of said ratio between voltages are respectively those of a first one of the bridges and of a second one of the bridges, and the first and second one of the bridges are respectively switched:
according to the first and second ones of the two sequences when the value of the ratio between voltages is greater than the transformation ratio; and
according to the second and first ones of the two sequences when the value of the ratio between voltages is smaller than the transformation ratio (n).

According to an embodiment:
one of the states of the first one of the two sequences corresponds to a given direction of application of a voltage to the transformer by the bridge having the first one of the two sequences applied thereto; and
the first one of the two sequences varies during a same halfwave of an AC voltage across one of the bridges, so that:
during at least one first time period, switchings into and out of said one of the states occur in a same state of the second one of the two sequences; and
during at least one second time period, switchings into and out of said one of the states occur in different states of the second one of the two sequences.

An embodiment provides a device configured to implement a method such as defined hereabove.

An embodiment provides a converter comprising a device such as defined hereabove.

According to a second aspect, an embodiment provides a method of controlling a converter comprising two H bridges coupled by a transformer, wherein:

repetitions of two switching sequences between a plurality of states are respectively applied to the two bridges;

the switchings of the sequences occur at times resulting from calculations based on a desired equality between values of a current in the transformer at one of said times of one of the two sequences and at one of said times of the other one of the two sequences; and for each of said calculations, a constant frequency, common to said repetitions and identical for the two bridges, is selected prior to the calculations.

According to an embodiment, a value representative of a duration between said times of the two sequences is determined according to the voltages across the two bridges, to said constant frequency, to a transformation ratio of the transformer, to a leakage inductance of the transformer.

According to an embodiment, said value is selected as being the smallest solution of equation:

$$x = \frac{-b - \sqrt{\Delta}}{2a},$$

where:
a and b are only a function of the voltages across the transformer and of said transformation ratio, and
$\Delta$ is further a function of said constant frequency, of said leakage inductance, and of a value of power to be transferred.

According to an embodiment, said calculations are further based on an equality between:

a power to be transferred between the bridges by the converter, represented by a set point; and a power calculated from a model of the converter and from values of voltages across the bridges.

According to an embodiment, the set point is calculated according to a value of the voltage received by one of the bridges and/or to a value of the voltage to be supplied by the other one of the bridges.

According to an embodiment, the received voltage is an AC voltage and the set point is calculated so that the converter (has a PFC-type operation.

According to an embodiment, the common frequency results from a previous calculation based on an equality between said set point and a modeled power value located in predefined fashion between:

a limiting value of the transferrable power modeled according to at least one value representative of durations between said times of the two sequences; and a modeled power value for which a value of a current in the transformer during one of the switchings is equal to a current threshold or to zero.

According to an embodiment, the common frequency has a constant value.

According to an embodiment:

the two sequences each comprise two respective switching cycles of two branches of the bridge having the sequence applied thereto;

the cycles of a first one of the two sequences are phase-shifted with respect to each other; and the cycles of a second one of the two sequences are inverse to each other.

According to an embodiment, the cycles of the first and/or second one of the two sequences have a duty cycle substantially equal to 0.5.

According to an embodiment:
one of the states of the first one of the two sequences corresponds to a given direction of application of a voltage to the transformer by the bridge having the first one of the two sequences applied thereto; and the first one of the two sequences varies during a same halfwave of an AC voltage across one of the bridges, so that:
during at least one first time period, switchings into and out of said one of the states occur in a same state of the second one of the two sequences; and
during at least one second time period, switchings into and out of said one of the states occur in different states of the second one of the two sequences.

According to an embodiment, the bridges are respectively switched:
according to the first and second ones of the two sequences when the value of a ratio between respective voltages of the bridges is greater than a transformation ratio of the transformer; and
according to the second and first ones of the two sequences when the value of the ratio between respective voltages of the bridges is greater than the transformation ratio.

According to an embodiment, the sequences have between each other a phase shift and are generated based on opposite desired values of said phase shift for values inverse to each other of a ratio of the ratio between voltages to the transformation ratio (n).

According to an embodiment, the bridges are respectively switched:
according to the first and second ones of the two sequences when the value of the ratio between voltages is greater than the transformation ratio; and
according to the second and first ones of the two sequences when the value of the ratio between voltages is smaller than the transformation ratio.

According to an embodiment, the two sequences are generated from a same value representative of an interval between switching times of the two sequences:
for a value of a ratio between voltages across the two bridges greater than the transformation ratio; and
for a value of the ratio between voltages smaller than the transformation ratio.

An embodiment provides a device configured to implement a method such as defined hereabove.

An embodiment provides a converter comprising a device such as defined hereabove.

According to a third aspect, an embodiment provides a method of controlling a converter comprising two H bridges coupled by a transformer, wherein:

repetitions of two switching sequences between a plurality of states are respectively applied to the two bridges;

one of the states of a first one of the two sequences corresponds to a given direction of application of a voltage to the transformer by the bridge having the first one of the two sequences applied thereto;

the first one of the two sequences varies during a same halfwave of an AC voltage across one of the bridges, so that:
during at least one first time period, switchings into and out of said one of the states occur in a same state of a second one of the two sequences; and
during at least one second time period, switchings into and out of said one of the states occur in different states of the second one of the two sequences.

In other words, this third aspect provides a method of controlling a converter comprising two H bridges coupled by a transformer, wherein:

repetitions of two switching sequences between a plurality of states are respectively applied to the two bridges; and the two sequences are generated from a same value representative of an interval between switching times of the two sequences, said same value being selected according to whether a ratio between the respective voltages across the H bridges is greater or smaller than a transformation ratio of the transformer.

According to an embodiment, the converter operates in boost mode if said voltage ratio is greater than said transformation ratio and in buck mode in the opposite case.

According to an embodiment:

the two sequences each comprise two respective switching cycles for two branches of the bridge having the sequence applied thereto;

the cycles of a first one of the two sequences are phase-shifted with respect to each other;

the cycles of a second one of the two sequences are inverse to each other; and preferably, the cycles of the first and/or second one of the two sequences have a duty cycle substantially equal to 0.5.

According to an embodiment, the switchings of the sequences occur at times resulting from calculations based on an equality between:

a power to be transferred between the bridges by the converter, represented by a set point value; and a power calculated from a model of the converter and from values of the voltages across the bridges.

According to an embodiment, the set point is calculated according to a value of the voltage received by one of the bridges and/or to a value of the voltage to be supplied by the other one of the bridges.

According to an embodiment, the received voltage is an AC voltage and the set point is calculated so that the converter has a PFC-type operation.

According to an embodiment, said calculations are further based on a desired equality between values (of a current in the transformer at one of the switching times of one of the two sequences and at one of the switching times of the other one of the two sequences.

According to an embodiment, for each of said calculations, a frequency common to said repetitions is selected prior to said calculation.

According to an embodiment:

during the first period, the set point is smaller than a maximum transferrable power value estimated according to a value representative of a first duration between switching times of the two sequences;

during the second period, the set point is greater than a minimum transferrable power value estimated according to a value representative of a second duration between switching times of the two sequences; and transitions from the first period to the second period and/or from the second period to the first period are started by the crossing by the set point, respectively, of the maximum value and/or of the minimum value.

According to an embodiment, each of said switchings comprises a dead time, and said calculations are based, during at least central portions of the first and second periods, on a desired value of the current in the transformer at one of the switching times greater than a current threshold, so that the switchings are of ZVS type during said central portions.

According to an embodiment, during at least one third period astride the first and second periods and located outside of said central portions, said calculations are independent from the current threshold.

According to an embodiment, the two sequences are generated from a same value representative of an interval between switching times of the two sequences:

for a value of a ratio between voltages across the two bridges greater than a transformation ratio of the transformer; and for a value of the ratio between voltages smaller than the transformation ratio.

According to an embodiment, the bridges are respectively switched:

according to the first and second ones of the two sequences when the value of a ratio between respective voltages of the bridges is greater than a transformation ratio (n) of the transformer; and according to the second and first ones of the two sequences when the value of the ratio between respective voltages of the bridges is greater than the transformation ratio.

An embodiment provides a device configured to implement a method such as defined hereabove.

An embodiment provides a converter comprising a device such as defined hereabove.

According to an embodiment, the transformer comprises a leakage inductance having its value decreasing when a current in the transformer increases in absolute value.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 7B schematically shows in the form of timing diagrams an embodiment of still another switched-mode converter control step;

FIG. 12 schematically an example of a variation curve of an inductance according to a current, according to an embodiment.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the converter elements such as switches, drivers, a converter transformer, a leakage inductance of a transformer, or capacitive elements, are not described in detail, the described embodiments being compatible with such elements of a usual converter.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
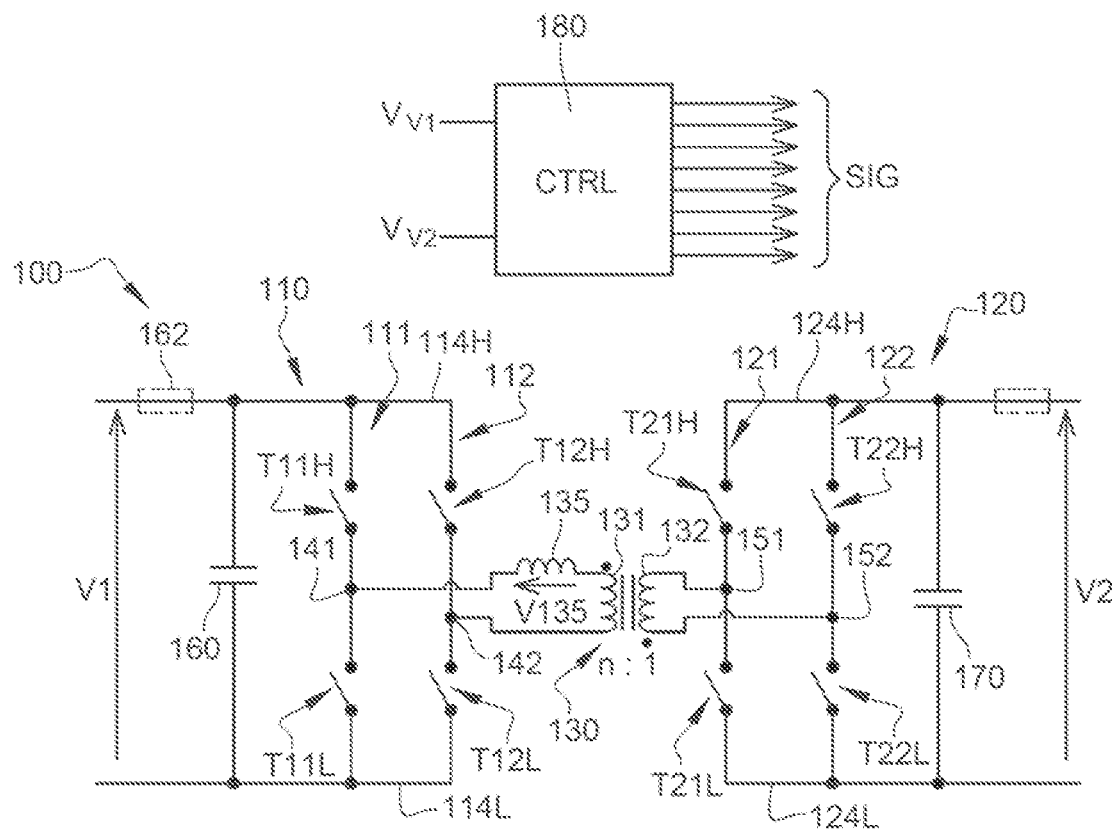
FIG. 1 schematically shows an example of a switched-mode converter of a type to which the described embodiments apply.

FIG. 1 schematically shows an example of a switched-mode converter 100 of a type to which the described embodiments apply.

In the shown example, converter 100 receives a voltage V1 and outputs a voltage V2.

Voltage V1 may be an AC voltage, for example supplied by a source such as an electric distribution network. The AC voltage may be of sinusoidal or substantially sinusoidal type. The AC voltage may have a rms. value in the order of 230 V or of 110 V, and a frequency equal to 50 Hz or 60 Hz. The AC voltage may also originate from an alternator. As a variant, voltage V1 may be a DC voltage, for example originating from a battery or from photovoltaic cells.

Voltage V2 may be a DC voltage, for example, linked to a battery. As an example, converter 100 may then form a charger of the battery from voltage V1. The battery may be a vehicle battery and the DC voltage typically varies between 250 V and 450 V during the battery charge. The converter is then provided to supply the battery with a power typically in the range from 1 kW to 30 kW during the battery charge. The DC voltage may also, in another example, be delivered to another stage, not shown, of the converter. As a variant, voltage V2 may be an AC voltage, for example linked to an electric network (the converter then forming a power inverter) or to coils of an electric motor.

Converter 100 comprises an H bridge 110, for example, receiving voltage V1. H bridge means a parallel association of at least two branches (branches 111 and 112 for H bridge 110) between two terminals or nodes (nodes 114H and 114L for H bridge 110).

Each branch of the bridge is defined by an association of two switches electrically in series between the terminals of the branch. In H bridge 110, branch 111 comprises switches T11H and T11L in series between nodes 114H and 114L, switch T11H being located on the side of node 114H. Branch 112 comprises switches T12H and T12L in series between nodes 114H and 114L, switch T12H being located on the side of node 114H.

Converter 100 further comprises an H bridge 120, for example supplying voltage V2. H bridge 120 comprises two branches 121 and 122 electrically in parallel between terminals 124H and 124L. Branch 121 comprises switches T21H and T21L in series between nodes 124H and 124L, switch T21H being located on the side of node 124H. Branch 122 comprises switches T22H and T22L in series between nodes 124H and 124L, switch T22H being located on the side of node 124H.

In the example when voltage V1 is an AC voltage, each of switches T11H, T11L, T12H, T12L is bidirectional for the voltage, that is, it is adapted, in its off state, to preventing the flowing of a current in both directions of the voltage across the bidirectional switch. Typically, each voltage-bidirectional switch may comprise or be formed by two field-effect transistors of same channel type, for example, an N channel, electrically in series, preferably connected by their drains. The described embodiments are compatible with usual types of voltage-bidirectional switches.

Thus, the switches of the H bridge(s) which, among bridges 110 and 120, delivers and/or receives an AC voltage, are bidirectional for the voltage.

Each voltage-bidirectional switch is controlled by application of a control signal having two levels respectively corresponding to the on and off states of the switch. This application is not described in detail herein, the embodiments being compatible with usual methods of application to a bidirectional switch of such a control signal.

Typically, the switches T11H, T11L, T12H, T12L, T21H, T21L, T22H, T22L, of the two bridges are further bidirectional for the current, that is, each adapted, in its on state, to allowing the flowing of a current in both directions through the switch. In the example where voltage V2 is a DC voltage, switches T21H, T21L, T22H, T22L each comprise a field-effect transistor, for example having an N channel having its drain facing the side of the terminal which, among terminals 124H and 124L of application of voltage V2, has the highest potential (terminal 124H in the shown direction of voltage V2).

H bridges 110 and 120 are coupled by a transformer 130. In other words, the transformer has a winding 131 coupling together two nodes 141 and 142 of one of the H bridges (bridge 110) and another winding 132 coupling together two nodes 151 and 152 of the other one of the H bridges (bridge 120). Nodes 141, 142, 151, 152 are nodes of series connection of the switches, respectively T11H and T11L, T12H and T12L, T21H and T21L, T22H and T22L, of the respective branches 111, 112, 121, and 122 of the H bridges. In the shown example, winding 131 has a phase point on the side of node 141 and winding 132 has a phase point on the side of node 152.

Transformer 130 comprises a leakage inductance 135. In the shown example, the leakage inductance couples a terminal of winding 131 to node 141. Leakage inductance 135 may comprise one or a plurality of inductive elements, such as wound conductors, electrically in series with one and/or the other of windings 131 and 132. Leakage inductance 135 may also, totally or partly, result from an incomplete magnetic coupling between windings 131 and 132. In other words, in this case, transformer 130 is has, between its windings 131 and 132, a coupling coefficient smaller than one.

The leakage inductance may have a constant or substantially constant value for the values of the current I135 flowing through winding 131. The value of the leakage inductance is a function of the power to be transferred by the converter, for example, between 10 W and 20 kW. As an example, leakage inductance 135 has a value in the range from 1 to 1,000 µH.

The transformer has, between windings 132 and 131, a transformation ration (n:1). The transformation ratio between a first winding and a second winding designates a ratio of a number of spirals of the second winding to a number of spirals of the first winding. If transformer 130 is disconnected from the device and if a voltage is applied across winding 132, the transformation ratio is typically substantially equal to the ratio of a voltage across winding 131 to the applied voltage. The transformation ratio depends on the voltages involved and on the power to be transferred by the converter. As an example, the transformation ratio is in the range from 0.5 to 1, for example, in the order of 0.75.

In operation, in each branch, the two switches are controlled in reverse, that is, so that when one of the switches in the branch is in the on or closed state, the other one of the switches in the branch is in the off or open state.

Preferably, in each of branches 111, 112, 121, and 122, the switches are alternately set to the on and off states at a switching frequency. In other words, each branch is alternately switched, repeatedly, between a state where one of the switches in the branch is on and another state when the other one of the switches is on. Typically, at each switching, a dead time is provided, during which the two switches in the switched branch are simultaneously off, to avoid a short-circuiting of the terminals in the branch.

Thus, in each bridge, the switchings of the branches form a switching sequence. The switching sequences of the two branches are repeated at the switching frequency. At each repetition of the switching sequences, the leakage inductance has the function of storing/releasing energy, to having this energy flow from one bridge to the other of the converter.

For this purpose, leakage inductance 135 has between its terminals a variable voltage equivalent to a voltage V135 across the shown leakage inductance. More precisely, voltage V135 is located between node 141 and winding 131. The calculation of the value of voltage V135 across leakage inductance 135 according to the convention selected to show this leakage inductance is within the abilities of those skilled in the art based on the examples of the present disclosure.

Preferably, the converter further comprises a capacitive element 160 coupling the terminals 114L and 114H of H bridge 110. Capacitive element 160 may be formed by a capacitor and/or a plurality of capacitors in series and/or in parallel. Voltage V1 is typically applied between nodes 114H and 114L through an impedance 162. Capacitive element 160 and impedance 162 form a filter enabling to limit variations, at each switching, of voltage V1 and of the current supplied to the converter.

Preferably, the converter further comprises a capacitive element 170 coupling terminals 124L and 124H of H bridge 120. Capacitive element 170 may be formed by a capacitor and/or a plurality of capacitors in series and/or in parallel. The voltage V2 between nodes 124H and 124L is typically supplied by the converter through an impedance 172. Capacitive element 170 and impedance 172 form a filter enabling to limit variations, at each switching, of voltage V2 and/or of the current supplied by the converter.

The converter further comprises a control circuit 180 (CTRL). Control circuit 180 receives values $V_{V1}$ and $V_{V2}$ representative of respective voltages V1 and V2. Values VV1 and VV2 may be generated by any usual device, not shown, for measuring a voltage between two terminals.

Control circuit 180 delivers signals SIG for controlling switches T11H, T11L, T12H, T12L, T21H, T21L, T22H, and T22L. Control circuit 180 may be formed by any device capable of implementing a converter control method, and in particular of generating control signals SIG.

Control circuit 180 typically comprises a digital data processing unit, such as a microprocessor, and a memory. The memory comprises a program. The execution of the program by the microprocessor causes the implementation of the converter control method, that is, the generation of control signals SIG.

Control signals SIG are applied to the switches in usual fashion by circuits, not shown, such as driver circuits and/or circuits of isolation between reference potentials of the switch control signals (for example, the source potentials of the transistors) and of control circuit 180.

Figure 2:
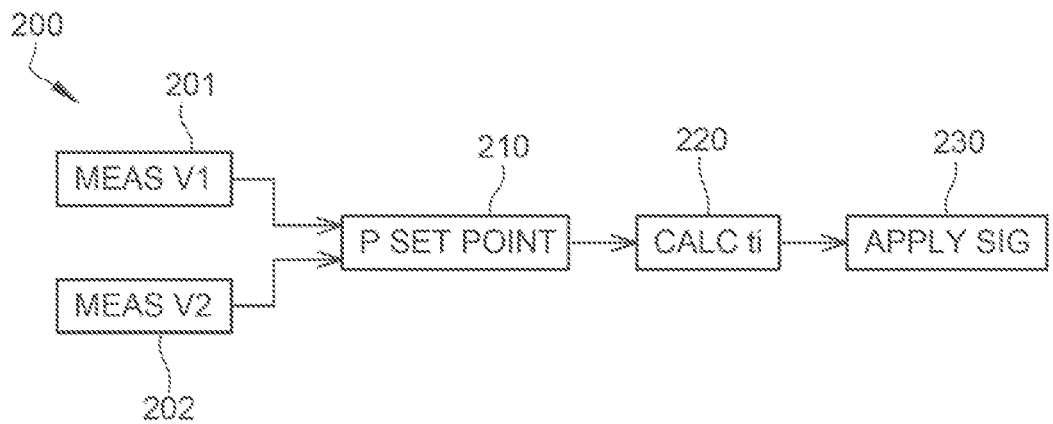
FIG. 2 schematically shows in the form of blocks an example of a method of controlling the converter of FIG. 1.

FIG. 2 schematically shows in the form of blocks an example of a method 200 for controlling the converter of FIG. 1.

At a step 201 (MEAS V1), the voltage V1 between terminals 114H and 114L is measured. This results in value $V_{V1}$ (FIG. 1) representative of voltage V1.

As a variant, voltage V1 is predefined. In the case where voltage V1 is an AC voltage, step 201 may then be any step of generation of a value representative of the values of voltage V1 according to time, for example, by any step of generation of values varying sinusoidally in phase with voltage V1. Value $V_{V1}$ may also be a predefined constant, in the case where voltage V1 is continuous and predefined.

At a step 202 (MEAS V2), the voltage V2 between terminals 124H and 124L is measured. This results in value $V_{V2}$ (FIG. 1) representative of voltage V2. Steps 201 and 202 may be simultaneous.

At a step 210 (P SET POINT), control circuit 180 (FIG. 1) receives the values $V_{V1}$ and $V_{V2}$ obtained at steps 201 and 202. Control circuit 180 determines, that is, calculates, based on values $V_{V1}$ and/or $V_{V2}$, a power set point P* (not shown in FIG. 2), representative of a power to be transferred by the converter from H bridge 110 to H bridge 120.

In an example, the converter has an average set point to be supplied over one or a plurality of halfwaves of the AC voltage. This average power may correspond to a power to be supplied, for example, to a battery in charge. Set point P* can then be determined from value $V_{V1}$ only.

This example is not limiting and, in other examples may correspond to a different use of a battery charge. Set point P* is also determined from values $V_{V1}$ and $V_{V2}$.

Figure 3:
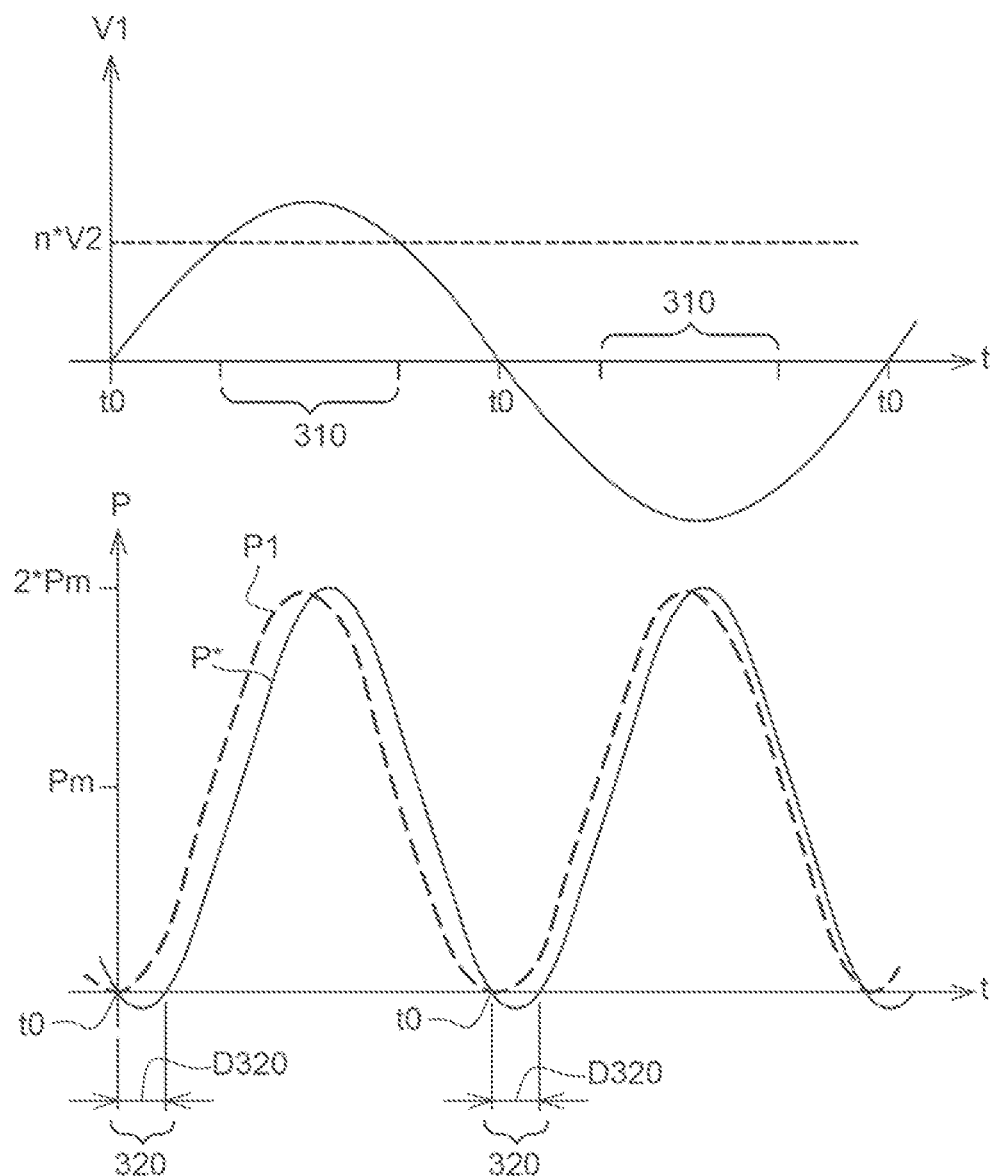
FIG. 3 schematically shows in the form of timing diagrams an example of a step of calculation of a power set point of the converter of FIG. 1.

An example of determination of power set point P* is described hereafter in relation with FIG. 3.

After steps 201 and 202, at a step 220 (CALC ti), control circuit 280 calculates times ti, repeated at the switching frequency, of the switchings to be applied to branches 111, 112, 121, and 122.

To calculate switching times ti, a model of the converter is used. The model provides, according to voltages V1 and possibly V2, and to switching times ti, a prediction of the converter operation. The model thus supplies modeled, in other words predicted, values, that is, values estimated from the model. These values are for example currents, voltages and/or powers in various elements of the converter, such as the switches or the transformer. The model is preferably such that, in operation, these currents, voltages, and/or powers take values substantially equal, preferably equal, to the modeled values.

In particular, the model provides a modeled value of the power P transferred by the converter from bridge 110 to bridge 120. The calculations performed at step 220 are such that times ti are those for which the modeled value is equal to set point P*. Power value equal to set point P* means that this value is equal to the power represented by set point P*.

In other words, the calculation of times ti is based on an equality between:
  the power value represented by power set point P*; and
  a power calculated from the converter model and values $V_{V1}$ and possibly $V_{V2}$.

The control signals SIG (FIG. 1) to be applied to the converter switches are then supplied by control circuit 180 based on the calculated times ti.

At a step 230 (APPLY SIG), the control signals SIG obtained at step 220 are applied to the converter switches.

The method of FIG. 2 is typically implemented repeatedly, measurement steps 201 and 202 being for example carried out continuously, and steps 210 and 220 being typically implemented at each loop of a program of the microcontroller of device 180 (FIG. 1).

FIG. 3 schematically shows in the form of timing diagrams an example of a step of calculation of a power set point in the converter of FIG. 1. More particularly, the calculation is performed in the preferred case where the voltage V1 across H bridge 110 (FIG. 1) is an AC voltage. More particularly, FIG. 3 shows:
  a timing diagram of voltage V1 according to time t, over the duration of a full wave of voltage V1. One calls full wave of an AC voltage the assembly of two halfwaves, each formed of a period during which the AC voltage has a single sign between two zero crossings at times t0; and
  a timing diagram showing variation curves of powers (P), more particularly a target power P1 which is desired to be sampled by the converter from the source of voltage V1, and the power represented by the calculated set point P.

In the shown example, the value of voltage V2 across H bridge 120, multiplied by transformation ratio n (that is, a value of voltage n*V2) is smaller than the peak value of voltage V1 across H bridge 110. As a result, during a central period 310 of each halfwave of voltage V1, voltage V1 is, in absolute value, greater than voltage V2. Outside of periods 310, voltage V1 is, in absolute value, smaller than voltage V2.

The power set point is calculated by the following equality (1):

[Math 1]

$$P^* = P1 - P160 \tag{1}$$

where P160 stands for a power supplied to capacitive element 160 (FIG. 1) for its charge and its discharge during variations of voltage V1.

Powers P1 and P160 are algebraic quantities each capable of taking positive and negative values. Algebraic quantity supplied to an element means that, when the algebraic quantity takes a positive value, the latter is effectively supplied to the element and that, when the algebraic quantity takes a negative value, the latter is, in absolute value, supplied by this element. Set point P* may also take positive and negative values. A negative set point of a power to be transferred from H bridge 110 (FIG. 1) to H bridge 120 (FIG. 1) means that a power represented by the absolute value of this set point is to be transferred from H bridge 120 to H bridge 110.

Target power P1 is proportional to (that is, has a constant ratio with) square V1*V1 of voltage V1. This corresponds to a PFC-type operation of the converter. The set point P* provided by relation (1) then corresponds to the power which is desired to be sampled by the converter from voltage source V1, to obtain a PFC-type operation of the converter. A PFC-type operation avoids creating a phase shift and/or harmonics in the consumed current with respect to the input voltage.

In the case where voltage V1 is sinusoidal, power P* corresponds to a square sinusoid, that is, to another sinusoid having a frequency double that of voltage V1 and varying from 0 to a maximum value 2*Pm, where Pm is an average power sampled by the converter from the source of voltage V1.

The calculation of power P160 is calculated by a usual step of calculation of a power absorbed by a capacitive element receiving an AC voltage. Power P160 is a sinusoid in quadrature with power P1. As a result, after each time t0 when the AC voltage takes the zero value, power set point P* is negative during a period 320 of duration D320 starting at time t0. Power set point P* is positive outside of periods 320.

In other words, set point P* represents, during periods 320, a power to be transferred from H bridge 120 to H bridge 110 and, outside of these periods, a power to be transferred from H bridge 110 to H bridge 120. Still in other words, it is desired for energy to flow in both directions between the converter bridges.

The described embodiments provide, in a switched-mode converter of the type of that in FIG. 1, that is, comprising two H bridges coupled by a transformer, to obtain switchings based on power P* enabling to obtain for the power transferred in practice between the H bridges to be closer to power set point P* than in usual methods for obtaining switchings based on a power set point. This results in an improvement of the PFC-type operation, that is, a harmonics decrease in the AC current supplied by the source of the AC voltage.

Further, the described embodiments provide obtaining the switchings more simply than with usual methods. In particular, the embodiments provide obtaining the switchings to be applied to the branches for both signs of the power set point (that is, in both energy transfer directions between the bridges) and in both upper/lower directions of comparison between voltage V1 and the product n*V2 of voltage V2 by transformation ratio n.

Figure 4:
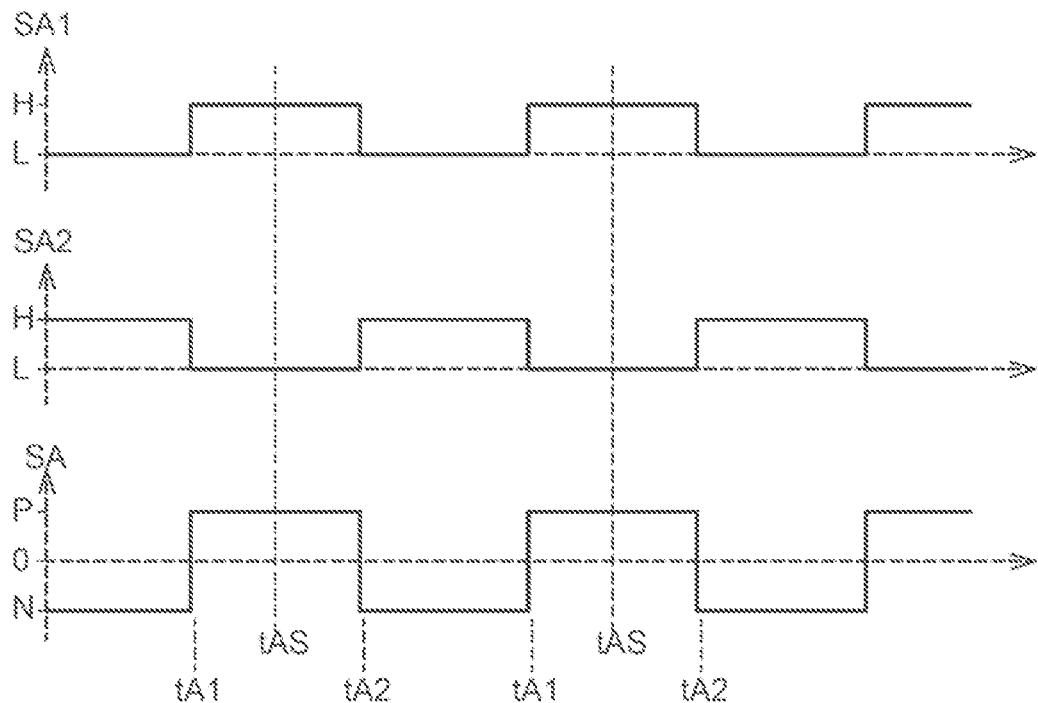
FIG. 4 schematically shows in the form of timing diagrams, an example of an H bridge switching sequence used in embodiments of converter control methods.

FIG. 4 schematically shows in the form of timing diagrams an example of an H bridge switching sequence SA used in the embodiments of methods of controlling a converter of the type of that in FIG. 1.

As an example, switching sequence SA is applied to H bridge 110 (FIG. 1). Switching sequence SA is repeated at the switching frequency.

Switching sequence SA comprises two switching cycles SA1 and SA2 repeated in the two respective branches 111 and 112 of H bridge 110. As an example, for each of switching cycles SA1 and SA2, low (L) and high (H) levels corresponding to the respectively on and off states of the switch T11H, T12H of the branch having the switching cycle applied thereto have been shown. In other words, the shown states of cycles SA1 and SA2 correspond to the signals for controlling the respective switches T11H and T12H. The signals, not shown, for controlling switches T11L and T12L are, to within dead times, inverse to the represented signals for controlling respective switches T11H and T12H.

In other words, to within dead times, in the example where cycle SA is applied to bridge 110, for each of cycles SA1 and SA2:

the high level corresponds to an on state of the respective switch T11H, T12H and to an off state of the respective switch T11L, T12L; and the low level corresponds to an off state of the respective switch T11H, T12H, and to an on state of the respective switch T11L, T12L.

Cycles SA1 and SA2 are preferably inverse to each other. In other words, the switches T11H and T12H of bridge 110, located on the side of the same terminal 114H of bridge 110, are controlled in reverse with respect to each other. Similarly, the switches T11L and T12L of bridge 110, located on the side of the same terminal 114L of bridge 110, are controlled in reverse with respect to each other.

Thus, at a time tA1 of each repetition of sequence SA, sequence SA comprises two simultaneous switchings of cycles SA1 and SA2. At time tA1, bridge 110 switches, in other words toggles, from a state N to a state P. At state N, for two switches (T11H and T12H, or T12L and T11L) of bridge 110 located on the side of a same terminal (respectively 114H or 114L) of bridge 110, the two switches are respectively controlled to the off and on states and at state P, the two switches are respectively controlled the on and off states.

Similarly, at a time tA2 of each repetition of sequence SA, bridge 110 switches from state P to state N.

At each repetition of the switching sequence, times tA1 and tA2 of switching into and out of state P are placed symmetrically with respect to a time tAS. Time tAS may as a variant be defined by that with respect to which the times tA2 and tA1 of switching into and out of state N are placed.

Each of cycles SA1 and SA2 has a duty cycle defined by the duration for which cycle SA1, SA2 is at the level where the respective switch T11H, T12H is controlled to the on state (high level). In the case of cycles SA1 and SA2 inverse to each other, the duty cycles of cycles SA1 and SA2 have, to within dead times, their sum equal to 1.

Preferably, the duty cycles of cycles SA1 and SA2 are substantially equal to 0.5, more preferably equal to 0.5 to within dead times. In other words, cycles SA1 and SA2 inverse to each other are also in phase opposition. As a result, sequence SA has identical durations for the two states N and P. At each repetition of sequence SA, these identical durations are located symmetrically with respect to time tA1 or to time tA2. Thus, the N and P states of sequence SA are arranged symmetrically with respect to time tAS.

Switching sequence SA, described hereabove in its application to H bridge 110, may be similarly applied to H bridge 120 (FIG. 1), by replacing, with respect to the above-described application to bridge 110, branches 111 and 112 respectively with branches 121 and 122 (FIG. 1). More precisely, for this purpose, as compared with the above-described application to bridge 110, switches T11H, T11L, T12H and T12L, are respectively replaced with switches T21H, T21L, T22H and T22L.

Figure 5:
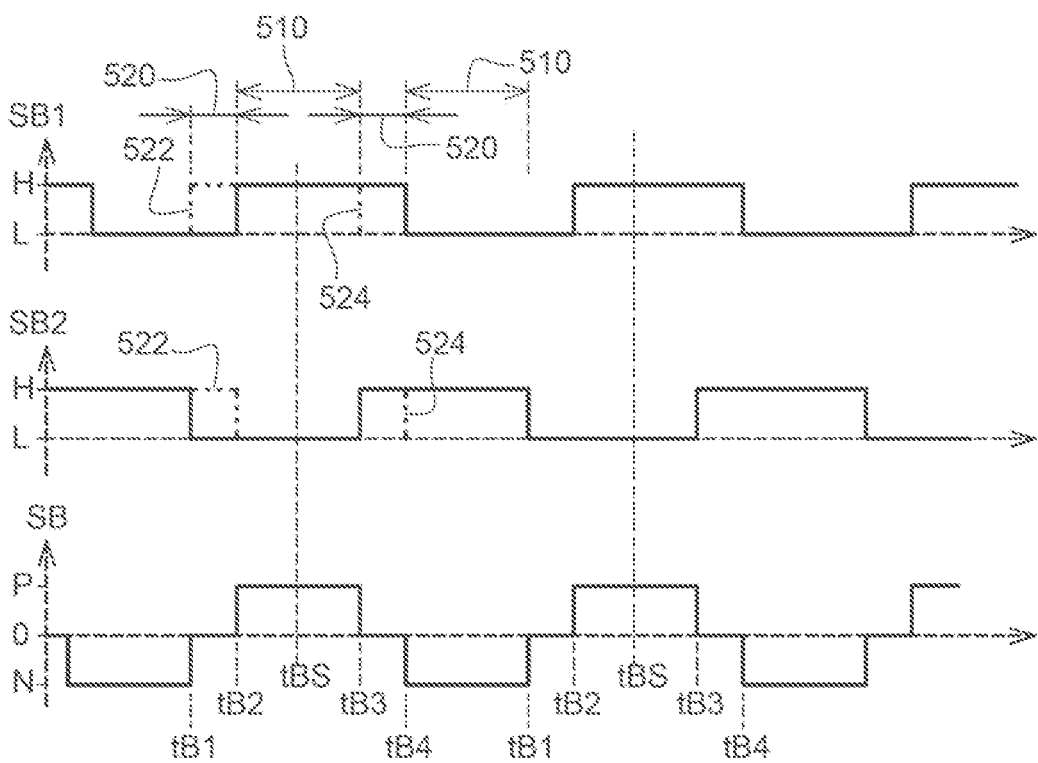
FIG. 5 schematically shows in the form of timing diagrams an example of another H bridge switching sequence used in embodiments of converter control methods.

FIG. 5 schematically shows in the form of timing diagrams an example of another H bridge switching sequence used in embodiments of methods of controlling a converter of the type of that in FIG. 1.

As an example, switching sequence SB is applied to H bridge 120 (FIG. 1). Switching sequence SB is repeated at the same switching frequency as the sequence SA of FIG. 4.

Switching sequence SB comprises two switching cycles SB1 and SB2 repeated in the two respective branches 121 and 122 of H bridge 120. As an example, for each of switching cycles SB1 and SB2, low (L) and high (H) levels corresponding to the respectively on and off states of the switch T21H, T22H of the branch having the switching cycle applied thereto have been shown. In other words, the shown states of cycles SB1 and SB2 correspond to the signals for controlling the respective switches T21H and T22H. The signals, not shown, for controlling switches T21L and T22L are, to within dead times, inverse to the represented signals for controlling respective switches T21H and T22H.

In other words, in the example where cycle SB is applied to bridge 120, for each of cycles SB1 and SB2:

the high level corresponds to an on state of the respective switch T21H, T22H and to an off state of the respective switch T21L, T22L; and the low level corresponds to an off state of the respective switch T21H, T22H, and to an off state of the respective switch T21L, T22L.

Each of cycles SB1 and SB2 has a duty cycle defined by the duration for which cycle SB1, SB2 is at the level at which the respective switch T21H, T22H is controlled to the on state (high level). Preferably, the duty cycles of cycles SB1 and SB2 are substantially equal to 0.5, more preferably equal to 0.5 to within dead times.

Cycles SB1 and SB2 are preferably phase-shifted with respect to each other. In other words, cycles SB1 and SB2 have a same duty cycle and exhibit periods 510 during which cycles SB1 and SB2 are at different levels.

This results, at each repetition of sequence SB, in:

a time tB1 of switching of cycle SB2 from its high state to its low state. Bridge 120 switches from a state N to a state O;

a time tB2 of switching of cycle SB1 from its low state to its high state. Bridge 120 switches from state O to state P;

a time tB3 of switching of cycle SB2 from its low state to its high state. Bridge 120 switches from state P to state O; and a time tB4 of switching of cycle SB1 from its high state to its low state. Bridge 120 switches from state O to state N. Sequence SB then returns to its initial state before time tB1.

Times tB1, tB2, tB3, and tB4 follow one another in each sequence, in this order or may be permuted according to the selected initial state of sequence SB.

The states N and P of bridge 120 correspond to the states N and P described in relation with FIG. 4, that is, for the two switches of the bridge located on the side of a same terminal of the bridge, at state N, the off and on states are respectively controlled and, at state P, the on and off states are respectively controlled. State O corresponds to a state in which two switches of bridge 120 located on the side of one of the terminals of bridge 120 are simultaneously in the on state, the two other switches of the bridge (located on the side of the other one of the terminals of bridge 120) are then in the off state. Thus, at state O, the configuration of the switches of bridge 120 corresponds to one among:

the configuration in which switches T21H and T22H are on and switches T21L and T22L are off; and the configuration in which T21H and T22H are off and switches T21L and T22L are on.

At each repetition of the switching sequence, times tB2 and tB3 of switching into and out of state P are placed symmetrically with respect to a time tBS. Time tBS may as a variant be defined by that with respect to which times tB4 and tB1 of switching into and out of state N are placed symmetrically or by that with respect to which times tB1 and tB2, or tB3 and tB4, are placed symmetrically.

During each of periods 510, sequence SB is at one of states N or P. States N and P are alternated in the successive periods 510. Periods 510 are separated by periods 520 during which the sequence is at state O.

Due to the fact that the duty cycles of cycles SB1 and SB2 are equal, periods 520 have identical durations. Further, due to the fact that the duty cycles of cycles SB1 and SB2 are equal to 0.5, sequence SB is such that periods 510 have durations identical for the two states N and P. As a result, the states N, O, and P of sequence SB are arranged symmetrically with respect to time tBS.

The fact of providing for sequences SA (FIG. 4) and SB to have their states, respectively N and P, and N, O, and P, arranged symmetrically with respect to respective times tAS and tBS enables, in operation, to avoid the presence of a DC component of the current (I135, FIG. 1) in transformer 130 (FIG. 1).

In alternative embodiments, any other values of duty cycles and/or of phase shift of cycles SA1, SA2 and SB1, SB2 of the respective sequences SA and SB enabling to guarantee the absence of such a DC component may be provided. However, the provision of sequences SA and SB symmetrical with respect to times tAS and tBS more simply enables to avoid the DC component. Further, as an advantageous result, as will be illustrated in relation with FIGS. 6A to 6C and 7A to 7D, the current in the transformer has, in its two flow directions, variations symmetrical with respect to each other, which simplifies the obtaining of a modeled value of the current in the transformer according to time and of a modeled power P such as that defined in relation with FIG. 2.

Although state O of sequence SB results, in the example of the above-described cycles SB1 and SB2, from the phase shift of cycles SB1 and SB2 with respect to each other, as a variant, it may be provided for state O of sequence SB to be obtained in a way different from that described hereabove, for example:

by replacing, at time tB1, the switching of cycle SB2 from the high state to the low state with a switching of cycle SB1 from the low state to the high state and, at time tB2, the switching of cycle SB1 from the low state to the high state with a switching of cycle SB2 from the high state to the low state (dotted lines 522); and/or by replacing, at time tB3, the switching of cycle SB2 from the low state to the high state with a switching of cycle SB1 from the high state to the low state and, at time tB2, the switching of cycle SB1 from the high state to the low state with a switching of cycle SB2 from the low state to the high state (dotted lines 524).

Switching sequence SB, described hereabove in its application to H bridge 120, may be similarly applied to H bridge 110 (FIG. 1), by replacing, with respect to the above-described application to bridge 120, branches 121 and 122 respectively with branches 111 and 112 (FIG. 1). More precisely, for this purpose, as compared with the above-described application to bridge 120, switches T21H, T21L, T22H, and T22L, are respectively replaced with switches T11H, T11L, T12H, and T12L.

FIGS. 6A to 6D and 7A to 7D schematically show, in the form of timing diagrams, embodiments of steps of a method of controlling a converter to the type of the converter 100 of FIG. 1. Preferably, these steps are implemented at step 220 (FIG. 2) of calculation of times ti of switching of the bridges and of generation of the control signals to be applied to the bridges.

Each of FIGS. 6A to 6D and 7A to 7D shows variation curves according to time t:

of a switching sequence S110 of H bridge 110;

of a switching sequence S120 of H bridge 120;

of voltage V135 (FIG. 1) across the leakage inductance 135 of transformer 130; and of a current I135 flowing through the leakage inductance (that is, in the example shown in FIG. 1, through winding 131 of the transformer).

At each of the steps of FIGS. 6A to 6D and 7A to 7D, the sequences SA and SB of FIGS. 4 and 5 and the switching times tA1, tA2, tB1, tB2, tB3, and tB4 of sequences SA and SB are used. These times correspond to the times ti described in relation with FIG. 2.

In the examples of the steps shown in FIGS. 6A to 6D and 7A to 7D, voltage V1 is positive, and applied in a given direction (between nodes 141 and 142, FIG. 1) in a state P of sequence S110, and in an opposite direction (between nodes 142 and 141) in a state N of sequence S110. In other words, the states N and P of sequence S110 correspond to the respective directions of application of voltage V1 to the transformer by H bridge 110. A zero voltage is applied between nodes 141 and 142 (in other words, these nodes are shorted) in a state O of sequence S110.

Similarly, voltage V2 is positive and applied in a given direction (between nodes 151 and 152, FIG. 1) in a state P of sequence S120, and in an opposite direction (between nodes 142 and 141) in a state N of sequence S120. In other words, the states N and P of sequence S120 correspond to the respective directions of application of voltage V2 to the transformer by H bridge 120. A zero voltage is applied between nodes 151 and 152 (in other words, these nodes are shorted) in a state O of sequence S120.

The steps of FIGS. 6A to 6D may be implemented in a first operating mode of the converter. More precisely, one or a plurality of steps 6A to 6D, for example, all these steps, are implemented in different periods where the converter operates according to the first mode.

Figure 6A:
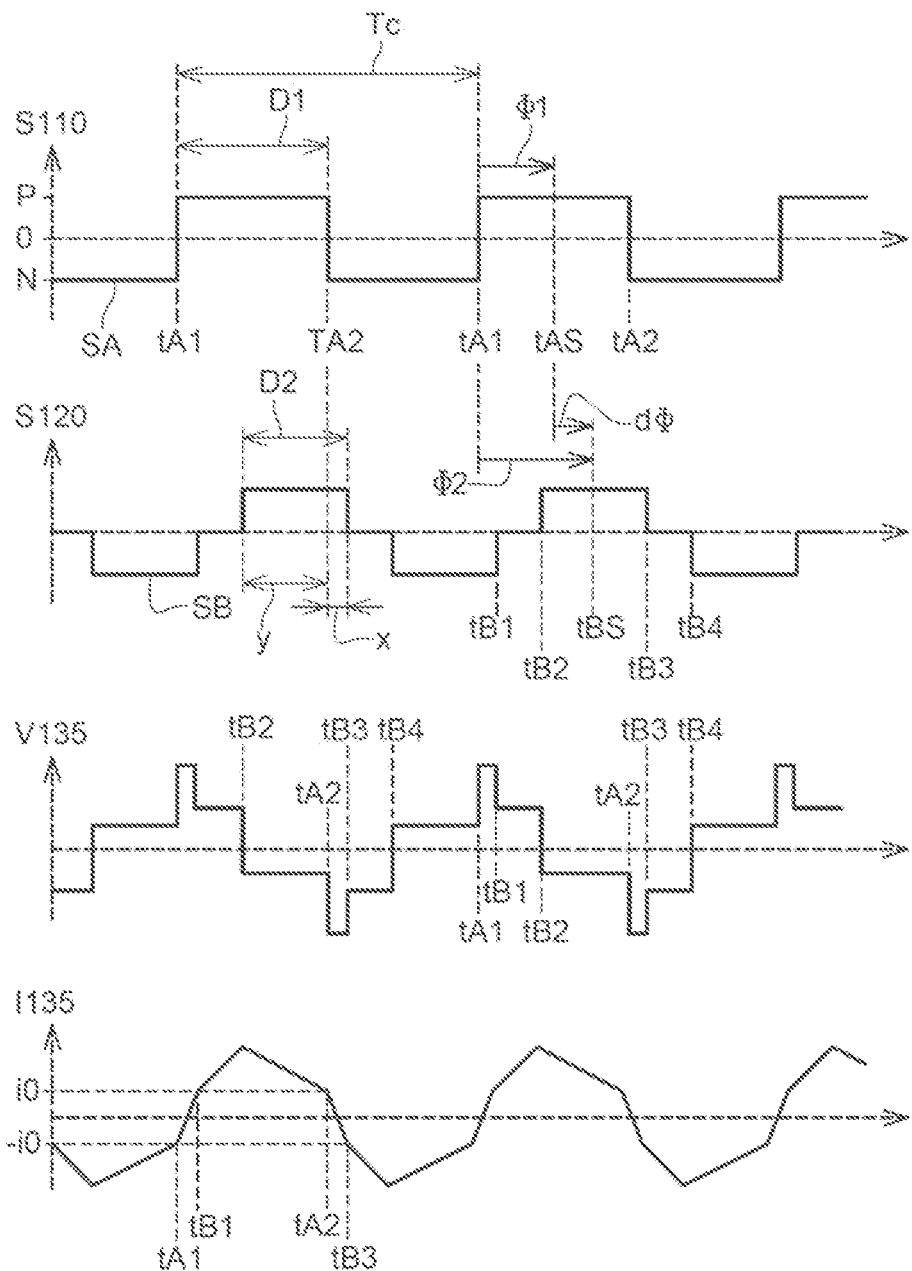
FIG. 6A schematically shows in the form of timing diagrams an embodiment of a switched-mode converter control step.

At the step of FIG. 6A, the value of voltage n*V2 (FIG. 3), is greater than that of voltage V1. In other words, the ratio V1/V2 between voltages across, respectively, H bridge 110 and H bridge 120, is smaller than the transformation ratio n between the winding 132 located on the side of H bridge 120 and the winding 131 located on the side of H bridge 110. Further, it is provided for the energy to flow from H bridge 110 to H bridge 120.

The sequence SA described hereabove in relation with FIG. 4 is applied to H bridge 110, repeatedly at the switching frequency. Thus, sequence S110 corresponds to sequence SA. In other words, the states P and N of sequence S110 correspond to the respective states P and N of sequence SA and sequence S110 does not take state O.

The sequence SB described hereabove in relation with FIG. 5 is applied to H bridge 120, repeatedly at the switching frequency. Thus, sequence S120 corresponds to sequence SB. In other words, the states P, O, and N of sequence S110 correspond to the respective states P, O, and N of sequence SB.

As mentioned hereabove, the present step is implemented in the first operating mode of the converter. In this first operating mode, the switchings into and out of a given state of sequence SB among states N and P occur in different states of sequence SA. In the present step, the switchings tB2 into and tB3 out of state P of sequence SB respectively occur in states P and N of sequence SA. Switchings tB4 into and tB1 out of state N of sequence SB respectively occur in states N and P of sequence SA. In other words, a switching (here at time tA2) of sequence SA occurs between the switchings into and out of (times tB2, tB3) state P of sequence SB. A switching (here at time tA1) of sequence SA occurs between the switchings into and out of (times tB4, tB1) state N of sequence SB.

The switching times tB1, tB2, tB3, and tB4 of sequence SB are defined with respect to times tA1 and tA2 of sequence SA by two parameters x and y. Parameters x and y are in the range from 0 to 0.5 and each correspond to a fraction of switching cycle time Tc (inverse of the switching frequency). Duration y*Tc (shown in Figure by letter y) separates each time tB2 from the next time tA2, and duration x*Tc (shown in Figure by letter x) separates each time tA2 from the next time TB3. In other words, parameters x and y form values representative of intervals between switching times, respectively tA2 and tB3, and tB2 and tA2. Parameters x and y are calculated as described hereafter.

Sequences SA and SB are generated from the calculated parameters x and y. Sequences SA and SB have between each other a phase shift dφ between time tAS and time tBS. The sequences are then applied to H bridges 110 and 120.

Preferably, to generate sequences SA and SB, a reference time of the sequences is defined. This time is for example generated by a signal of clock type at the switching frequency. As an example, the reference time is, in the present step, time tA1 of transition to state P of the sequence S110 applied to H bridge 110. The other switching times of sequences SA and SB are defined by:

a phase shift φ1 of sequence S110 between the reference time tA1 of the sequences and the time tAS of symmetry of sequence SA applied to H bridge 110;

a phase shift φ2 of sequence S120 between the reference time tA1 of the sequences and the time tBS of symmetry of sequence SB applied to H bridge 120;

a duty cycle D1 of sequence S110, defined by the ratio of the duration of a state P of sequence S110 to cycle time Tc; and a duty cycle D2 of sequence S120, defined by the ratio of the duration of a state P of sequence S120 to cycle time Tc.

Phase shifts φ1 and φ2, and duty cycles D1 and D2, are provided by the following equalities (2):

[Math 2]

$$D1 = 0,5 \\ \varphi 1 = \frac{\pi}{2} \\ D2 = x + y \\ \varphi 2 = 2\pi \left( \frac{1}{2} + \frac{x-y}{2} \right)$$ (2)

Voltage V135 takes values V1 n*V2, V1, V1 n*V2, n*V2 V1, V1, and V1+n*V2 when the respective states of sequences S110 and S120 are, respectively, N and P, N and O, P and P, N and N, P and O, and P and N, that is, respectively, between times tA2 and tB3, tB3 and tB4, tB2 and tA2, tB4 and tA1, tB1 and tB2, and TA1 and TB1.

Preferably, to calculate parameters x and y, the values of these parameters which enable to obtain an equality between values i0 of current I135 in the transformer at times tB1 and tA2 are searched for. In other words, parameters x and y, and thus, based on these parameters, times tA1, tA2, tB1, tB2, tB3, and tB4, result from calculations based on a desired or targeted equality between the values i0 of the current I135 in the transformer at times tB1 of sequence SB and tA2 of sequence SA, times tB1 and tA2 being separated by time tB2 of sequence SB.

For this purpose, a model of the converter is used as described in relation with FIG. 2. The model provides modeled values of the current I135 at times tB1 and tA2 according to parameters x and y, taking into account values such as those of voltages V1 and V2 across bridges 110 and 120. The converter model may be any usual model of a converter comprising two H bridges coupled by a transformer. An example of a preferred model of the converter is described hereafter in relation with FIG. 8, and corresponds to one or a plurality of algebraic expressions delivering the modeled value of current I135 according to time t and to parameters x and y.

Preferably, the calculation of parameters x and y comprises selecting, from among all the possible values of parameters x and y, those for which current I135 has, at times tB1 and tA2, the same modeled values. In other words, the calculated values of parameters x and y are those for which a relation of equality between the modeled values according to parameters x and y is fulfilled or verified. This may be obtained by any usual method of search for parameters for which a relation between values as a function of these parameters is fulfilled.

Figure 8:
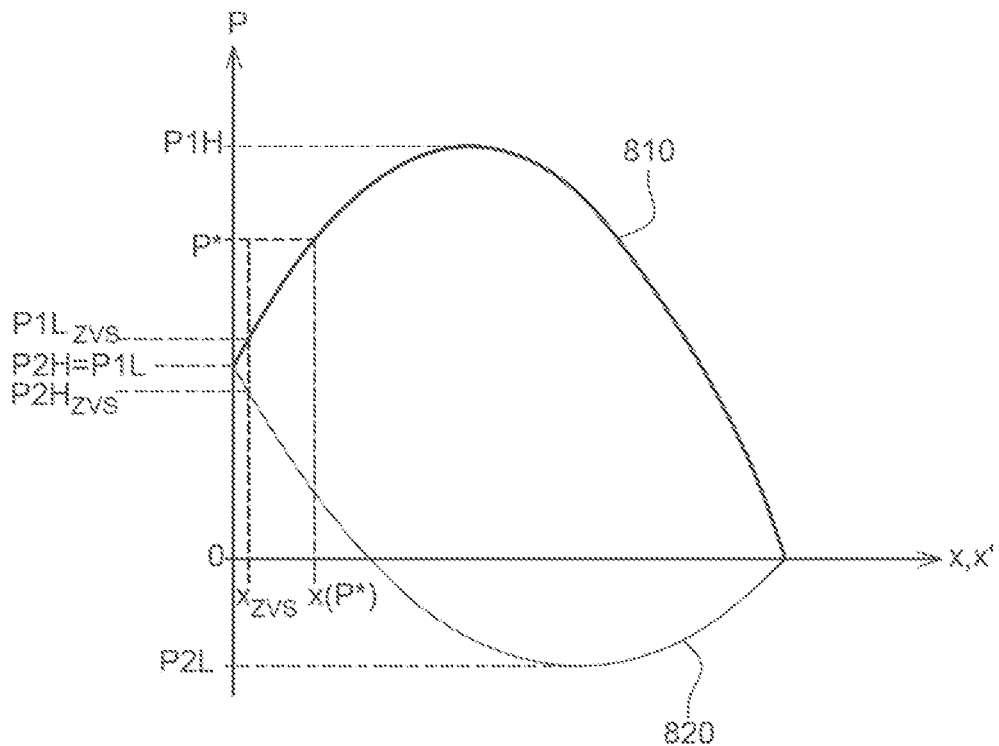
FIG. 8 schematically shows an example of the variation curve of a power according to a control parameter used at the steps of FIGS. 6A and 7A.

In examples, such as that described hereafter in relation with FIG. 8, the relation between values as a function of parameters x and y is algebraic, and the selection of values of parameters x and y which verify this relation may be performed by selecting a single one of the two values (for example, that of parameter x) and by calculating the other of the two values from this algebraic relation.

In other examples, the converter model is numerical and the relation between values as a function of parameters x and y is calculated numerically. The method of search for parameters x and y is then typically a numerical search by successive iterations. At each iteration, estimated values of parameters x and y approach those for which the relation is verified.

Due to the fact that current I135 has symmetrical variations in both its current flow directions, the desired equality between values i0 of current I135 at times tB1 and tA1 also corresponds to a desired equality between values −i0 of current I135 at times tA1 and tB3 separated by time tB2 of switching tB4, as well as to desired equalities, in absolute value, of current I135 at consecutive times (that is, not separated by a switching) tA1 and tB1, and or at consecutive times tA2 and tB3.

In variants, the calculation of parameters x and y may be performed based on any desired relation, defined according to the current in the transformer at the switching times of the two sequences. An example of such a desired relation is a desired equality between a ratio of values of the current at times tB1 and tA2, to a predefined value that may be different from 1.

Based on the converter model, in particular on the modeled values I135 and V135, a modeled value P of the power transferred according to time by the converter from H bridge 110 to H bridge 120, in average at each repetition of the switching sequences, can be calculated.

Preferably, the calculation of parameters x and y then comprises selecting, from among all the possible values of parameters x and y, those for which the power set point P* described in relation with FIGS. 2 and 3 is equal to modeled value P. In other words, the calculation of parameters x and y is based on an equality between power set point P* and the power calculated from the converter model and from voltage values V1 and V2.

In examples of calculation of parameters x and y, such as that described hereafter in relation with FIG. 8, the model corresponds to an algebraic expression P(x, y) providing value P according to parameters x and y. The calculation may then comprise any usual method, for example, numerical, of resolution equation P*=P(x, y) to obtain a set of values to be selected from parameters x and y.

In other examples, the converter model is numerical, and parameters x and y are numerically calculated by any usual method for solving the equation, such as an iterative method.

More preferably, the calculation of parameters x and y, and thus of the times of switching of sequences SA and SB, is based both on the desired equality between currents at times tB1 and t2A and on the desired equality between set point power P* and the power transferred by the converter between the bridges.

In variants, the power set point may be replaced with any value representative of a set point delivered to the converter, such as a set point for a current to be sampled from one of the bridges and/or to be supplied by the other one of the bridges. The desired equality between set point P* and the modeled power is then replaced with an equality between this current set point and an average value of this current, modeled according to the converter model, on each repetition of sequences SA and SB.

Figure 6B:
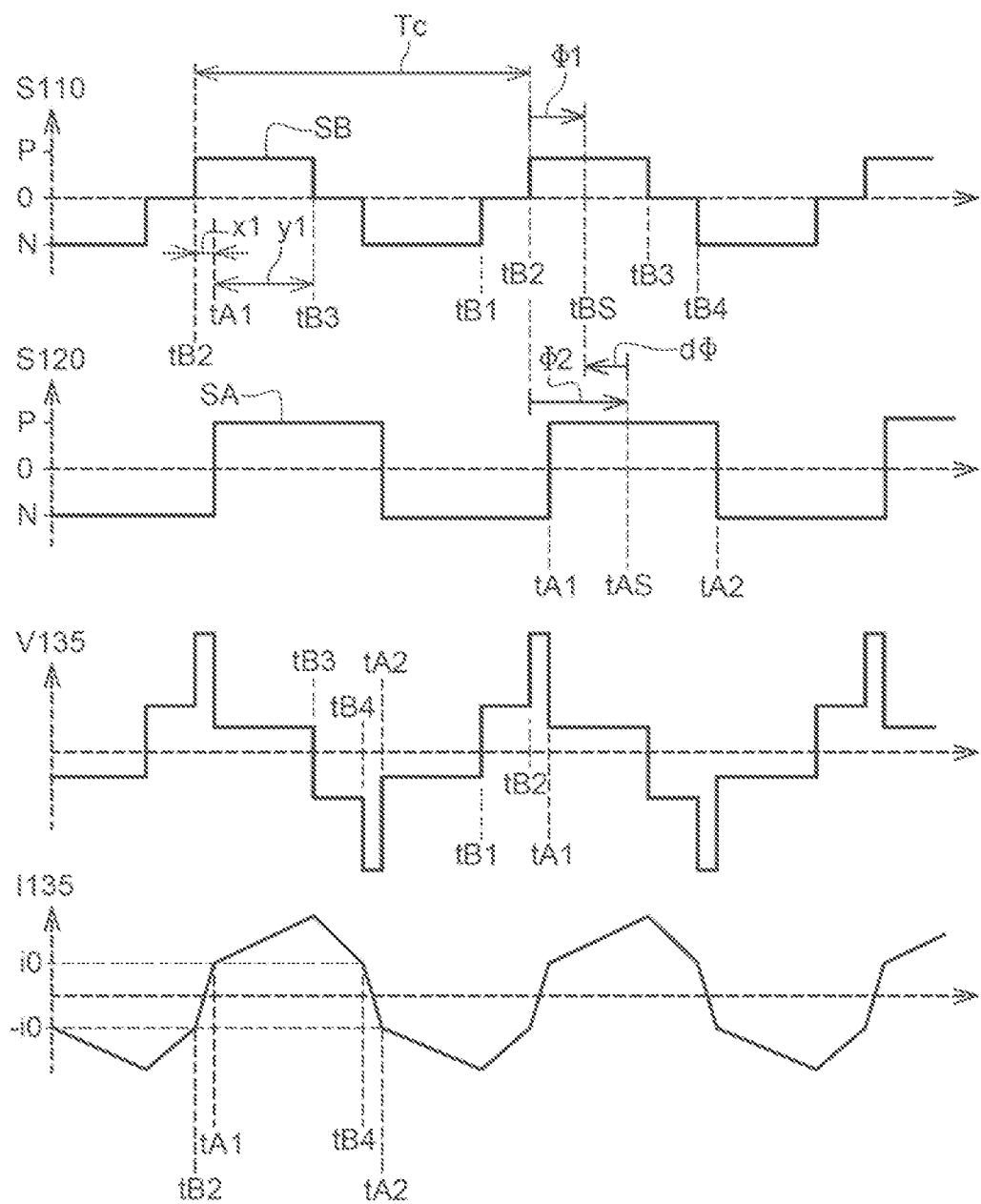
FIG. 6B schematically shows in the form of timing diagrams an embodiment of another switched-mode converter control step.

At the step of FIG. 6B, conversely to the step of FIG. 6A, the value of voltage n*V2 (FIG. 3) is smaller than that of voltage V1. In other words, the ratio V1/V2 between the voltages across, respectively, H bridge 110 and H bridge 120, is greater than the transformation ratio n between the winding 132 located on the side of H bridge 120 and the winding 131 located on the side of H bridge 110. Thus, a selection of the step of FIG. 6A or of FIG. 6B to be implemented is performed according to the result of the comparison of the ratio V1/(n*V2) of ratio V1/V2 to transformation ratio n with one. Further, it is provided, as at the step of FIG. 6A, that the energy flows from H bridge 110 to H bridge 120.

Unlike the step of FIG. 6A, the sequence SB described hereabove in relation with FIG. 5 is applied to H bridge 110 and the sequence SA described hereabove in relation with FIG. 4 is applied to H bridge 120, repeatedly at the switching frequency. Thus, sequence S110 corresponds to sequence SB and sequence S120 corresponds to sequence SA. In other words, the states P, O, and N of sequence S110 correspond to the respective states P, O, and N of sequence SB, and the states P and N of sequence S120 correspond to the respective states P and N of sequence SA.

As in the step of FIG. 6A, the step of FIG. 6B is implemented in the first operating mode, where the switchings into and out of a given state of sequence SB among states N and P occur in different states of sequence SA. In the present step, the switchings tB2 into and tB3 out of state P of sequence SB respectively occur in states N and P of sequence SA. The switchings tB4 into and tB1 out of state N of sequence SB respectively occur in states P and N of sequence SA.

The switching times tB1, tB2, tB3, and tB4 of sequence SB are defined with respect to times tA1 and tA2 of sequence SA by two parameters x1 and y1 in the range from 0 to 0.5 and each corresponding to a fraction of switching cycle time Tc. Duration x1*Tc (represented by x1) separates each time tB2 from the next time tA1, and duration y1*Tc (represented by y1) separates each time tA1 from the next time TB3.

Preferably, the switching times are defined with respect to the reference time of the sequences. As an example, the reference time is, in the present step, time tB2 of transition to state P of the sequence S110 applied to H bridge 110. The other switching times of sequences SA and SB are defined by:
the phase shift φ1 is defined in the same way as at the step of FIG. 6A, that is, by the phase shift of sequence S110 between the reference time tB2 of the sequences and the time tBS of symmetry of the sequence SB applied to H bridge 110;
the phase shift φ2 is defined in the same way as at the step of FIG. 6A, that is, by the phase shift of sequence S120 between the reference time tB2 of the sequences and the time tAS of symmetry of the sequence SA applied to H bridge 120;
a duty cycles D1 and D2, defined in the same way as at the step of FIG. 6A.

Voltage V135 takes values V1 n*V2, n*V2, n*V2 V1, V1−n*V2, n*V2, and V1+n*V2 when the respective states of sequences S120 and S110 are, respectively, N and P, N and O, P and P, N and N, P and O, and P and N, that is, respectively, between times tB4 and tA2, tB3 and tB4, tA2 and tB1, tA1 and tB3, tB1 and tB2, and TB2 and TA1.

According to a first aspect of the embodiments, to obtain parameters x1 and/or y1 in the present step (at which ratio V1/V2 is greater than transformation ratio n), parameters x1 and/or y1 are given the same values as the respective parameters x and/or y of the step of FIG. 6A (at which ratio V1/V2 is smaller than transformation ratio n).

As a result, the calculations of parameters x and/or y described hereabove in relation with FIG. 6A and an example of which is described hereafter in relation with FIG. 8 may at least partly be used to calculate parameters x1 and/or y1. This enables to simplify the obtaining of parameters x1 and/or y1.

The calculations of parameters x and/or y may be used to simplify the obtaining of parameters x1 and/or y1 by implementing one or a plurality of the steps of:
using a portion of the program implemented by the control circuit (180, FIG. 1) providing parameters x and/or y, and deducing parameters x1 and/or y1 therefrom. In other words, a same portion of the program is used to calculate parameters x and/or y, and x1 and/or y1;

as in the example of FIG. 8 hereafter, using one or a plurality of algebraic expressions providing parameters x and/or y, and deducing parameters x1 and/or y1 therefrom. In other words, one or a plurality of algebraic expressions are the same to calculate parameters x and/or y, and x1 and/or y1;

storing at least a portion of values calculated at the step of FIG. 6A to obtain parameters x and/or y, such as intermediate values of the calculations; and/or storing the values of parameters x and/or y obtained at the step of FIG. 6A.

Preferably, parameters x1 and y1 both take the same values as respective parameters x and y. As a result, the phase shift dφ defined in relation with FIG. 6A, between sequences SA and SB takes, at the step of FIG. 6B, a value opposite to that of this phase shift at the step of FIG. 6A. Opposite values means same absolute values and opposite signs. In other words, sequences SA and SB are generated based on opposite desired phase shift values dφ at the steps of FIGS. 6A and 6B.

As a result, when the ratio V1/(n*V2) of the ratio V1/V2 of voltages V1 and V2 to transformation ratio n takes at the step of FIG. 6B a value (in the order of 1.5 in the example shown in FIG. 6B) inverse to that of FIG. 6A (in the order of 1/1.5 in the example shown in FIG. 6A), current I135 takes same modeled values at time tA1 of sequence SA and tB4 of sequence SB. Current I135 thus takes same modeled absolute values at times tB2, tA1, tB4, and tA2, in other words, current I135 exhibits at the step of FIG. 6B desired equalities between values similar to the equalities of the step of FIG. 6A. The parameters x1 and y1 for which the desired equality between values of current I135 is verified are obtained more simply than if they were obtained as described in relation with FIG. 6A.

Preferably, a same switching frequency as that of the step of FIG. 6A is selected at the step of FIG. 6B. More preferably, parameters x1 and y1 are then given the values of parameters x and y when the ratio P*/(V1*V2) of the voltage set point to the product of voltages V1 and V2 is the same at the steps of FIG. 6A and of FIG. 6B. Product of voltages V1 and V2 here means the result V1*V2 of the multiplication of the values of voltages V1 and V2. When parameters x1 and y1 correspond to the desired equalities between current values, this results in that power set point P* is equal to the modeled power value P without it being necessary to perform the calculation of this modeled power. This result is illustrated hereafter in the specific example of the converter model described in relation with FIG. 8. The step of FIG. 6B is thus particularly simple to implement.

In a specific example, parameters x1 and y1 are given the values of parameters x and y when the respective values $V_{V1B}$ and $V_{V2B}$ of voltages V1 and V2 at the step of FIG. 6B are respectively equal to product n*$V_{V2A}$ and to ratio $V_{V1A}$/n, where $V_{V1A}$ and $V_{V2A}$ are the respective values of voltages V1 and V2 at the step of FIG. 6A. This enables to obtain the above-described inverse values of ratio VA/(n*V2) at the steps of FIGS. 6A and 6B. Preferably, this is implemented when the power set point is the same for all the steps of FIGS. 6A and 6B. Thereby, ratio P*/(V1*V2) is the same at these two steps.

When parameters x1 and y1 are respectively equal to parameters x and y, phase shifts φ1 and φ2, and duty cycles D1 and D2, are provided by the following equalities (3):

[Math 3]

$$D1 = x + y \quad (3)$$
$$\varphi 1 = 2\pi\left(\frac{x+y}{2}\right)$$
$$D2 = 0,5$$
$$\varphi 2 = 2\pi\left(\frac{1}{4} + x\right)$$

As a variant, a single one of the two parameters x1 and y1, preferably, parameter x1, takes the same value as parameter x. The other one of the two parameters may then result:

from a calculation based on a desired equality between values i0 of current I135 at times tA1 of sequence SA and tB4 of sequence SB separated by time tB3 of sequence SB, and/or values −i0 of current I135 at times tB2 and t12, and/or absolute values of current I135 at times tB2 and tA1, and tB4 and tA2; or from a calculation based on an equality between the opposite of set point P* and the modeled value P of the power transferred by the converter between H bridge 110 and H bridge 120.

Embodiments according to the first aspect are described hereabove, where parameters x1 and/or y1 are given values equal, respectively, to those of the parameters x and/or y calculated at the step of FIG. 6A. As mentioned hereabove, this results in avoiding implementing, at the step of FIG. 6B, calculations similar to those described in relation with FIG. 6A. In other embodiments according to the first aspect, at the step of FIG. 6, parameters x1 and/or y1 are calculated in a way similar to that described in relation with FIG. 6A and, at the step of FIG. 6A, parameters x and/or y are given the respective values of the calculated parameters x1 and/or y1.

Figure 6C:
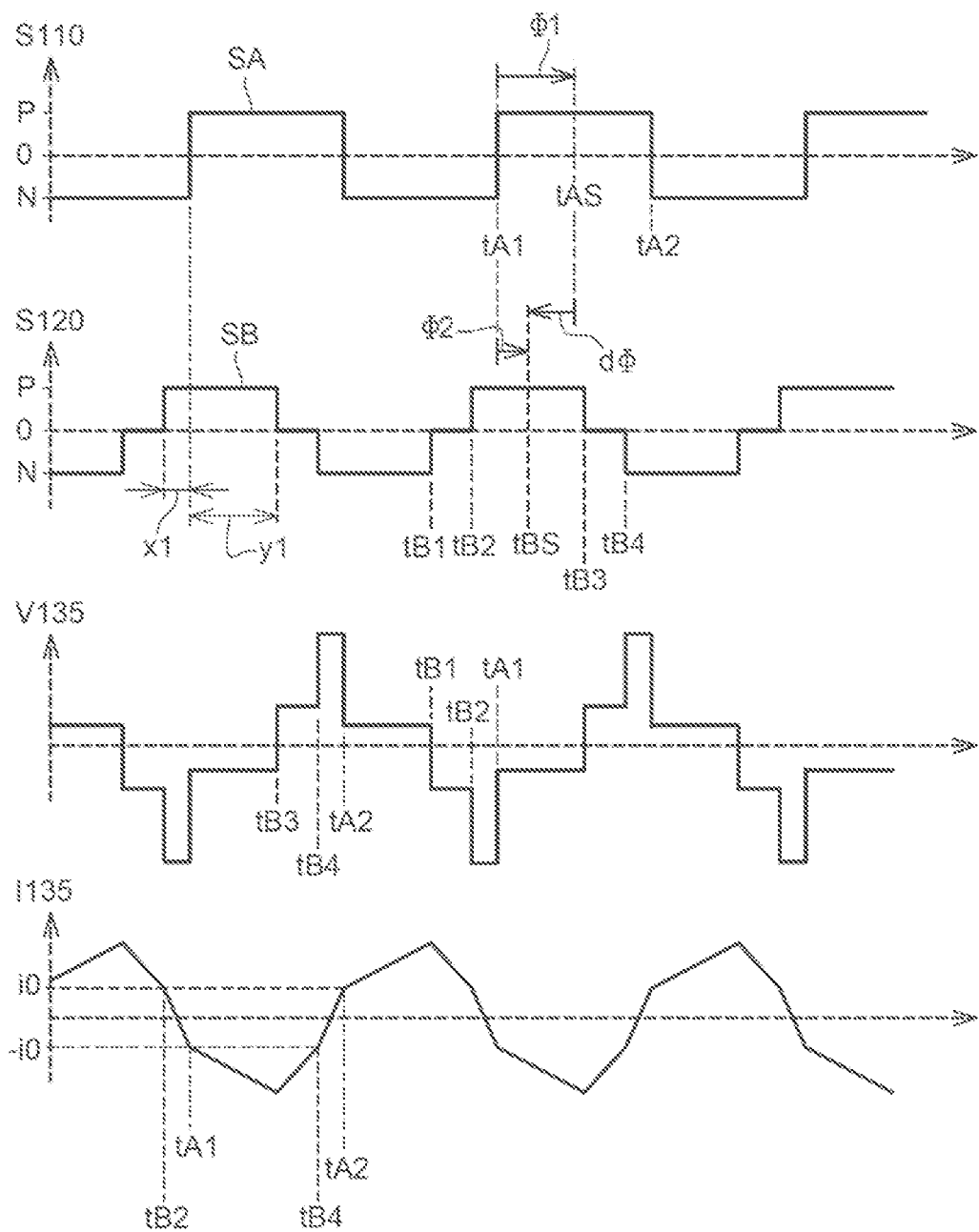
FIG. 6C schematically shows in the form of timing diagrams an embodiment of still another switched-mode converter control step.

At the step of FIG. 6C, as at the step of FIG. 6A, the value of voltage n*V2 (FIG. 3) is greater than that of voltage V1. Further, it is provided, conversely to the steps of FIGS. 6A and 6B, that the energy flows from H bridge 120 to H bridge 110.

As at the step of FIG. 6A, the sequence SA described hereabove in relation with FIG. 4 is applied to H bridge 110 and the sequence SB described hereabove in relation with FIG. 5 is applied to H bridge 120, repeatedly at the switching frequency.

Like the steps of FIGS. 6A and 6B, the step of FIG. 6C is implemented in the first operating mode. In the present step, the switchings tB2 into and tB3 out of state P of sequence SB respectively occur in states N and P of sequence SA. The switchings tB4 into and tB1 out of state N of sequence SB respectively occur in states P and N of sequence SA.

The switching times tB1, tB2, tB3, and tB4 of sequence SB are defined with respect to times tA1 and tA2 of sequence SA by the two parameters x1 and y1 defined in relation with FIG. 6B. Thus, according to embodiments of the first aspect, parameters x1 and/or y1 have values equal to those of the respective parameters x and/or y.

Preferably, switching time tA1 forms the reference time. The other switching times of sequences SA and SB are defined by phase shifts φ1 and φ2 and the duty cycles D1 and D2 defined in relation with FIG. 6A.

Voltage V135 takes values V1 n*V2, V1, V1 n*V2, n*V2 V1, V1, and V1+n*V2 when the respective states of sequences S110 and S120 are, respectively, N and P, N and O, P and P, N and N, P and O, and P and N, that is, respectively, between times tB2 and tA1, tB1 and tB2, tA1 and tB3, tA2 and tB1, tB3 and tB4, and TB4 and TA2.

According to an embodiment, the phase shift dφ between sequences SA and SB takes, at the step of FIG. 6C, a value opposite to that of this phase shift at the step of FIG. 6A. In other words, the phase shift takes opposite signs for the two opposite energy flow directions between the bridges.

As a result, for the same values of the voltage across the bridges as those of the step of FIG. 6A, the power transferred from H bridge 110 to H bridge 120 takes, at the step of FIG. 6C, an algebraic value opposite to that of the power transferred at the step of FIG. 6A. A flow direction can then be selected from among the two opposite flow directions, according to the sign of the power set point. In other words, for each value of the power transmitted in one direction between the bridges by applying sequences SA and SB having between them a value of phase shift dφ, a same value of the power transmitted in the other direction can be simply obtained by taking the opposite value of phase shift dφ.

Phase shifts φ1 and φ2, and duty cycles D1 and D2, are then provided by the following equalities (4):

[Math 4]

$$D1 = 0,5 \quad (4)$$
$$\varphi1 = \frac{\pi}{2}$$
$$D2 = x + y$$
$$\varphi2 = 2\pi\left(\frac{y-x}{2}\right)$$

Figure 6D:
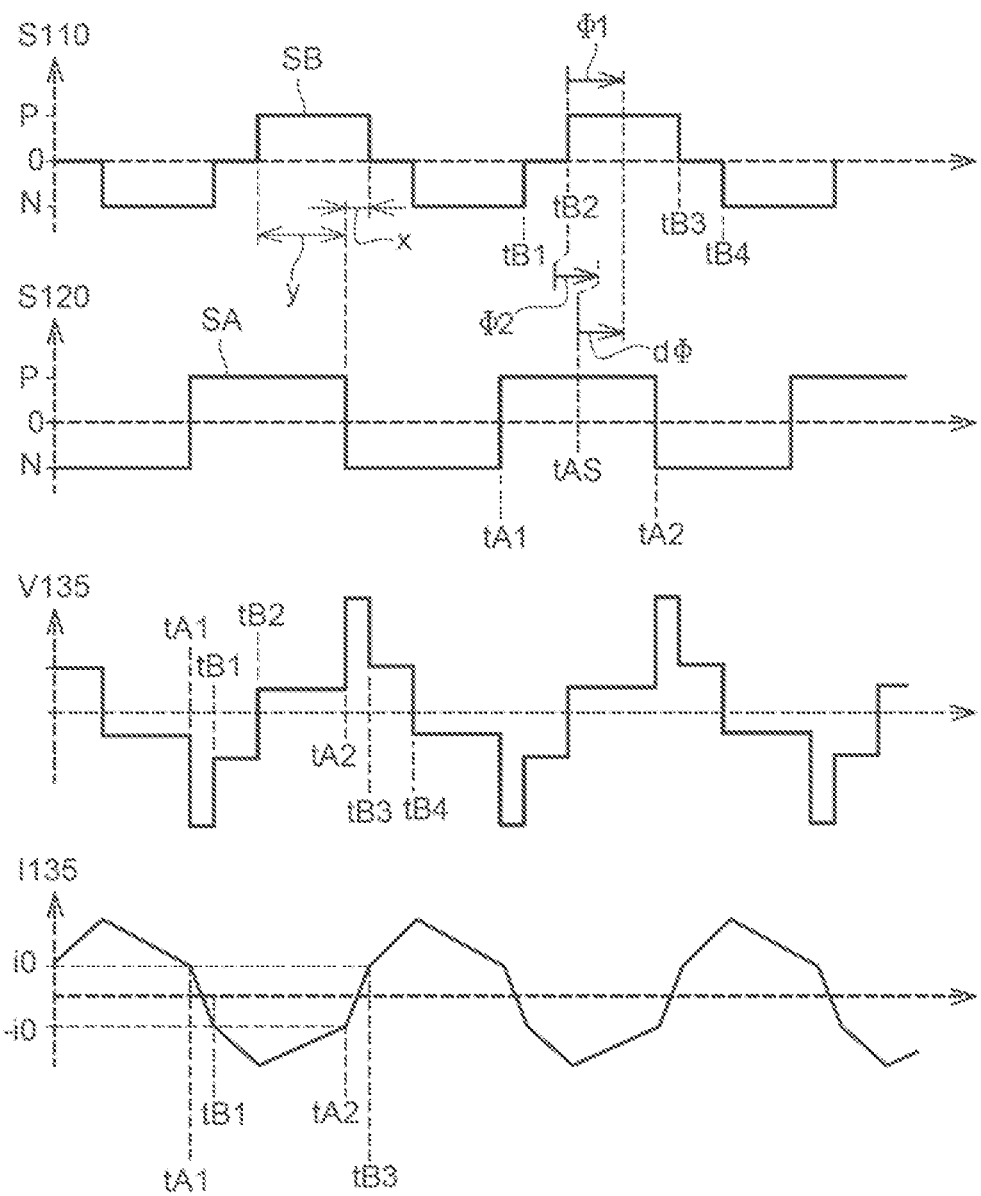
FIG. 6D schematically shows in the form of timing diagrams an embodiment of still another switched-mode converter control step.

At the step of FIG. 6D, as at the step of FIG. 6B, the value of voltage n*V2 (FIG. 3) is smaller than that of voltage V1. Further, it is provided, as at the step of FIG. 6C, for the energy to flow from H bridge 120 to H bridge 110.

As at the step of FIG. 6B, the sequence SB described hereabove in relation with FIG. 5 is applied to H bridge 110 and the sequence SA described hereabove in relation with FIG. 4 is applied to H bridge 120, repeatedly at the switching frequency.

Thus, in the steps of FIGS. 6A to 6D, H bridges 110 and 120 are respectively switched according to sequences SA and SB when the ratio V1/V2 between voltages V1 and V2 is smaller than transformation ratio n and according to sequences SB and SA when ratio V1/V2 is greater than the transformation ratio. Ratio V1/V2 is for example obtained from the measured values such as described in relation with FIG. 2.

The switching times tB1, tB2, tB3, and tB4 of sequence SB are defined with respect to times tA1 and tA2 of sequence SA by the two parameters x and y defined in relation with FIG. 6A.

Like the steps of FIGS. 6A, 6B, and 6C, the step of FIG. 6D is implemented in the first operating mode. In the present step, the switchings tB2 into and tB3 out of state P of sequence SB respectively occur in states P and N of sequence SA. The switchings tB4 into and tB1 out of state N of sequence SB respectively occur in states N and P of sequence SA.

Preferably, switching time tA1 forms the reference time. The other switching times of sequences SA and SB are defined by phase shifts φ1 and φ2 (defined in relation with FIG. 6B) and duty cycles D1 and D2 (defined in relation with FIG. 6A).

Voltage V135 takes values V1 n*V2, n*V2, n*V2 V1, V1−n*V2, n*V2, and V1+n*V2 when the respective states of sequences S120 and S110 are, respectively, N and P, N and O, P and P, N and N, P and O, and P and N, that is, respectively, between times tA1 and tB1, tB1 and tB2, tB4 and tA1, tB2 and tA2, tB3 and tB4, and TA2 and TB3.

Preferably, the switching times of sequences SA and SB of the step of FIG. 6D are obtained:

from the parameters x and y of the step of FIG. 6A, in a way similar to that described to obtain the sequences SA and SB of the step of FIG. 6C from the parameters x1 and y1 of the step FIG. 6B; and/or from the parameters x1 and y1 of the step of FIG. 6C, in a way similar to that described to obtain the sequences SA and SB of the step of FIG. 6B from the parameters x and y of FIG. 6A.

Phase shifts φ1 and φ2, and duty cycles D1 and D2, are provided by the following equalities (5):

[Math 5]

$$D1 = x + y \quad (5)$$
$$\varphi1 = 2\pi\left(\frac{x+y}{2}\right)$$
$$D2 = 0,5$$
$$\varphi2 = 2\pi\left(-\frac{1}{4} + y\right)$$

The steps of FIGS. 6A to 6D have been shown hereabove for positive voltages V1 and V2. However, voltages V1 and V2 may be algebraic quantities. When voltages V1 and/or V2 are negative, steps similar to those of FIGS. 6A to 6D may be obtained by replacing the values of voltages V1 and V2 with their absolute values. For this purpose, when voltages V1 and/or V2 are negative, the states N and P of respective sequences S110 and/or S120 are permuted.

The steps of FIG. 7A to 7D may be implemented in a second operating mode of the converter. More precisely, one or a plurality of steps 7A to 7D, for example, all these steps, are successively implemented in the second operating mode.

As for the steps of FIGS. 6A to 6D, the steps of FIGS. 7A to 7D are shown for positive values of voltages V1 and V2, however, similar steps may be obtained as described hereabove for negative values of voltages V1 and/or V2.

Figure 7A:
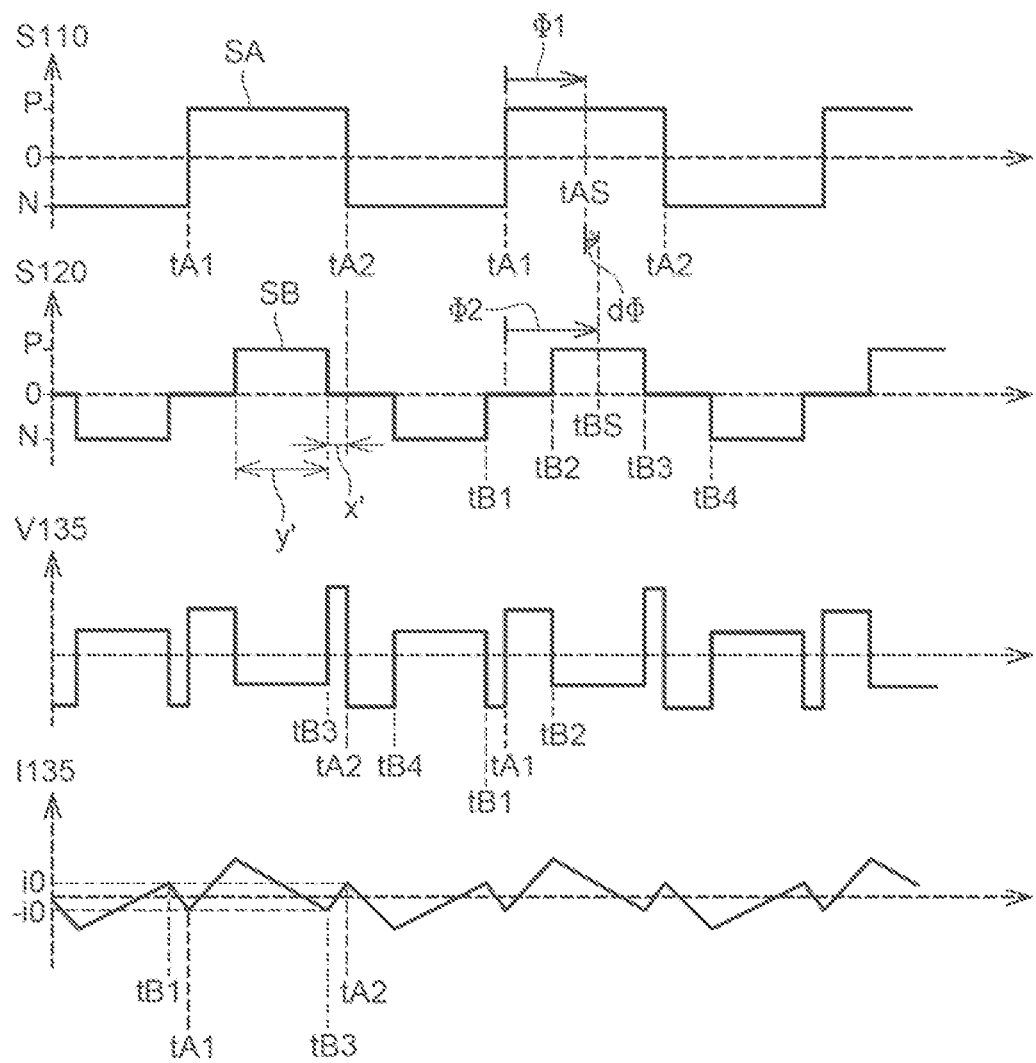
FIG. 7A schematically shows in the form of timing diagrams an embodiment of still another switched-mode converter control step.

At the step of FIG. 7A, as at that of FIG. 6A, the value of voltage n*V2 (FIG. 3) is greater than that of voltage V1, and it is provided for the energy to flow from H bridge 110 to H bridge 120.

As in the step of FIG. 6A, the respective sequences SA and SB described hereabove in relation with FIGS. 4 and 5 are applied to H bridges 110 and 120, repeatedly at the switching frequency.

As mentioned hereabove, the present step is implemented in the second operating mode of the converter. In this second operating mode, the switchings into and out of a given state of sequence SB among states N and P occur in a same state of sequence SA. In the present step, the switchings tB2 into and tB3 out of state P of sequence SB occur in state N of sequence SA. The switchings tB4 into and tB1 out of state N of sequence SB occur in state P of sequence SA.

The switching times tB1, tB2, tB3, and tB4 of sequence SB are defined with respect to times tA1 and tA2 of sequence SA by two parameters x' and y'. Parameters x' and y' are in the range from 0 to 0.5, each corresponding to a fraction of the switching cycle time Tc. Duration y'*Tc (represented by y') separates each time tB2 from the next time tB1, and duration x'*Tc (represented by x') separates each time tB3 from the next time TA2.

Parameters x' and y' are preferably calculated in a way similar to that described in relation with FIG. 6A, that is, more preferably:

based on an equality between modeled values, calculated from the model of the converter and from values of the voltages across the bridges, of a current in the transformer at switching times of sequences SA and SB (for example, times tA1 and tB3); and/or on an equality between the power represented by set point P* and the corresponding modeled power value P, calculated from the converter model and from values of voltages V1 and V2 across the bridges.

Sequences SA and SB are then generated from the obtained parameters x' and y' and applied to H bridges 110 and 120. Sequences SA and SB have between each other phase shift dφ, described hereabove, between time tAS and time tBS.

Preferably, the switching times of sequences SA and SB are defined with respect to reference time tA1 by phase shifts φ1 and φ2 and the duty cycles D1 and D2 defined in relation with FIG. 6A.

Phase shifts φ1 and φ2, and duty cycles D1 and D2, are provided from parameters x' and y' by the following equalities (6):

[Math 6]

$$D1 = 0,5 \\ \varphi1 = \pi/2 \\ D2 = y' \\ \varphi2 = 2\pi\left(\frac{1}{2} - x' - \frac{y'}{2}\right) \quad (6)$$

Voltage V135 takes values V1, V1 n*V2, n*V2 V1, and V1 when the respective states of sequences S110 and S120 are, respectively, N and O, P and P, N and N, P and O, that is, respectively, between times tB3 and tB4, tB2 and tA2, tB4 and tA1, tB1 and tB2. The respective states of sequences S110 and S120 are also, respectively, N and O, P and O between times, respectively, tB1 and tA1, tB3 and tA2.

Thus, in the present example of the second operating mode, as compared with the example of the first operating mode of FIG. 6A, the respective states N and P, P and N of sequences S110 and S120 between times tA1 and tB1 (FIG. 6A) and tA2 and tB3 (FIG. 6A) have been replaced with states N and O, P and O. This is due to the fact that state P of sequence SB starts after time tA1 and ends before time tA2, and that state N of sequence SB starts after time tA2 and ends before time tA1.

In this example, this results in that, between times tA1 and tB1 of the step of FIG. 7A, current I135 varies in a direction opposite to the variation direction of current I135 between times tB1 and tA1 of the step of FIG. 6A. Similarly, between times tB3 and tA2 of the step of FIG. 7A, current I135 varies in an direction opposite to the variation direction of current I135 between times tA2 and tB3 of the step of FIG. 6A.

As a result, the power transferred by the converter is relatively low in the second operating mode and relatively high in the first operating mode. This advantageous difference between transferred powers between the first and the second operating mode is similar for all the steps of FIGS. 6A to 6D and 7A to 7D. This difference between operating modes, and an example of advantageous use of this difference, is illustrated hereafter in the specific example of FIG. 8.

At the step of FIG. 7B, as at that of FIG. 6B, the value of voltage n*V2 (FIG. 3) is smaller than that of voltage V1, and it is provided for the energy to flow from H bridge 110 to H bridge 120.

Unlike at the step of FIG. 7A, sequence SB is applied to H bridge 110 and sequence SA is applied to H bridge 120, repeatedly at the switching frequency.

Like the step of FIG. 7A, the step of FIG. 7B is implemented in the second operating mode, where the switchings into and out of a given state of sequence SB among states N and P occur in different states of sequence SA. In the present step, the switchings tB2 into and tB3 and out of state P of sequence SB respectively occur in state P of sequence SA. The switchings tB4 into and tB1 out of state N of sequence SB occur in state N of sequence SA.

The switching times tB1, tB2, tB3, and tB4 of sequence SB are defined with respect to times tA1 and tA2 of sequence SA by two parameters x1' and y1' between 0 and 0.5 and each corresponding to a fraction of switching cycle time Tc. Duration x1'*Tc (represented by x1') separates each time tA1 from the next time tB2, and duration y1'*Tc (represented by y1') separates each time tB2 from the next time TB3.

Preferably, the switching times are defined with respect to reference time tA1 by phase shifts φ1 and φ2 and duty cycles D1 and D2, in the same way as at the step of FIG. 6B.

Voltage V135 takes values n*V2, n*V2 V1, V1 n*V2, n*V2, when the respective states of sequences S120 and S110 are, respectively, N and O, P and P, N and N, P and O, that is, respectively, between times tB3 and tB4, tA2 and tB1, tA1 and tB3, tB1 and tB2. Sequences S120 and S110 respectively take states N and O, P and O, between times, respectively, tA2 and tB4, and TA1 and TB2.

Preferably, parameters x1' and/or y1' in the present step are obtained, according to the first aspect, from the parameters x' and y' of the step of FIG. 7A in the same way as to obtain the parameters x1 and y1 of the step of FIG. 6B.

In particular, according to embodiments of the first aspect, parameters x1' and/or y1' are given the same values as the respective parameters x' and/or y' of the step of FIG. 7A. This is preferably done for a same ratio P*/(V1*V2) as at the step of FIG. 7A, and for a value of ratio V1/(n*V2) inverse to that of the step of FIG. 7A. This results in the same simplification advantages as for the step of FIG. 6B. In particular, the same desired values i0 of current I135 at times tB2 and tA2, as well as at values tA1 and tB4, are easily obtained. More precisely, the desired equality is obtained between the absolute values of current I135 at times tB2, tA2, tB1 and tB2.

When the values of parameters x1' and y1' are equal to those of parameters x' and y', phase shifts φ1 and φ2, and duty cycles D1 and D2, are provided by the following equalities (7):

[Math 7]

$$D1 = y' \\ \varphi1 = 2\pi\left(\frac{y'}{2}\right) \\ D2 = 0,5 \\ \varphi2 = 2\pi\left(\frac{1}{4} - x'\right) \quad (7)$$

In alternative embodiments according to the first aspect, parameters x1' and/or y1' are calculated, at the step of FIG. 7B, in a way similar to that described in relation with FIG. 6A and, at the step of FIG. 7A, parameters x' and/or y' are given the respective values of the calculated parameters x1' and/or y1'.

Figure 7C:
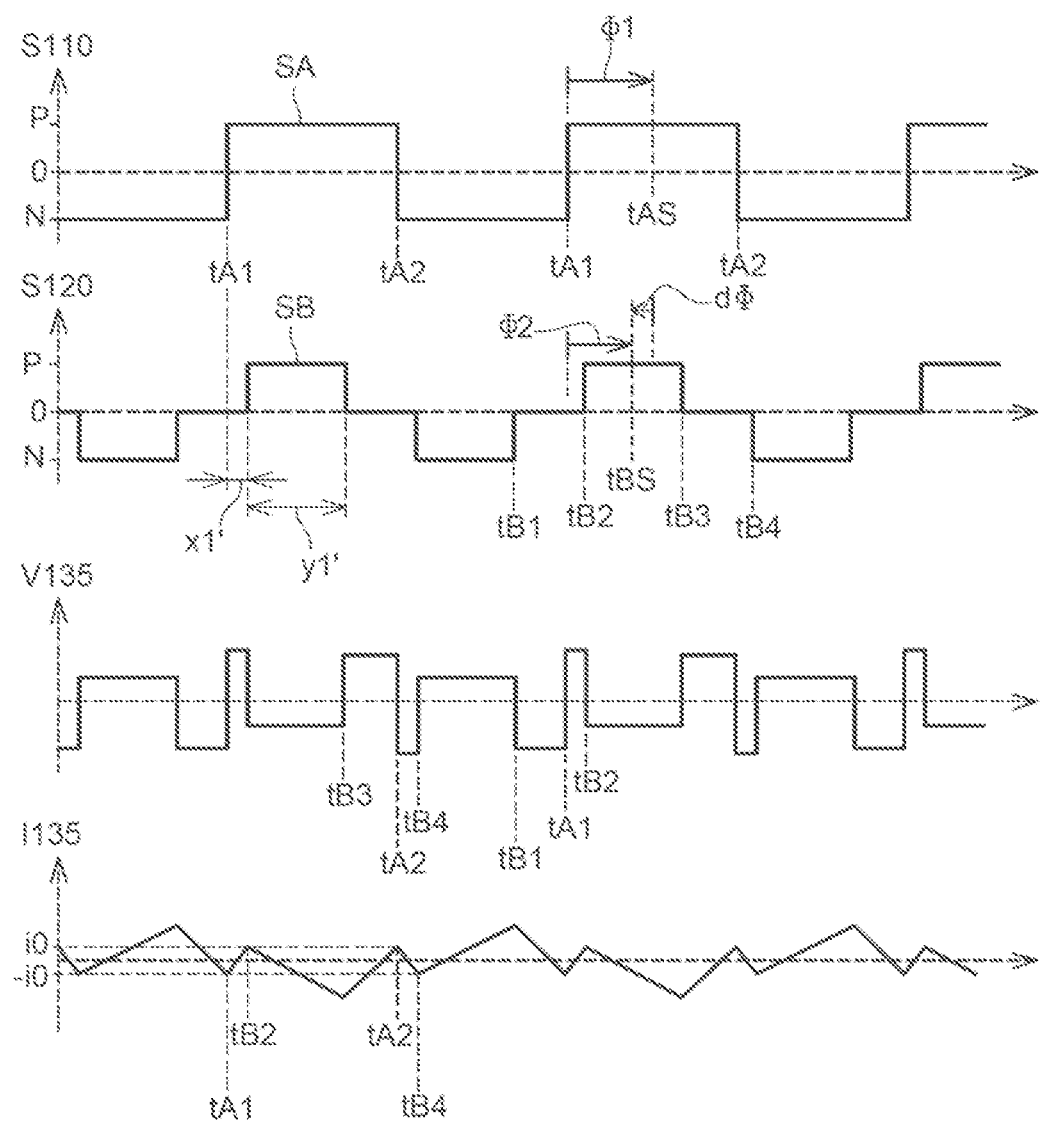
FIG. 7C schematically shows in the form of timing diagrams an embodiment of still another switched-mode converter control step.

At the step of FIG. 7C, as at the step of FIG. 6C, the value of voltage n*V2 (FIG. 3) is greater than that of voltage V1, and it is provided for the energy to flow from H bridge 120 to H bridge 110.

The sequence SA described hereabove in relation with FIG. 4 is applied to H bridge 110, and the sequence SB described hereabove in relation with FIG. 5 is applied to H bridge 120, repeatedly at the switching frequency.

The step of FIG. 7C is implemented in the second operating mode. In the present step, the switchings tB2 into and tB3 out of state P of sequence SB respectively occur in state P of sequence SA. The switchings tB4 into and tB1 out of state N of sequence SB occur in state N of sequence SA.

The switching times tB1, tB2, tB3, and tB4 of sequence SB are defined with respect to times tA1 and tA2 of sequence SA by the two parameters x1' and y1' defined in relation with FIG. 7B. Thus, according to embodiments of the first aspect, parameters x1' and/or y1' have values equal to those of the respective parameters x' and/or y'.

Preferably, switching time tA1 forms the reference time. The other switching times of sequences SA and SB are defined by phase shifts φ1 and φ2 and duty cycles D1 and D2, defined in relation with FIG. 6A.

Voltage V135 takes values −V1, V1−n*V2, n*V2−V1, and V1 when the respective states of sequences S110 and S120 are, respectively, N and O, P and P, N and N, P and O, that is, respectively, between times tB1 and tB2, tA1 and tB3, tA2 and tB1, and tB3 and tB4. Sequences S120 and S110 respectively take states P and O, N and O, between times, respectively, tA1 and tB2, TA2 and TB4.

According to an embodiment, the phase shift dφ between sequences SA and SB takes, at the step of FIG. 7C, a value opposite to that of this phase shift at the step of FIG. 7A.

Phase shifts φ1 and φ2, and duty cycles D1 and D2, are then provided by the following equalities (8):

[Math 8]

$$D1 = 0,5$$
$$\varphi 1 = \frac{\pi}{2}$$
$$D2 = y'$$
$$\varphi 2 = 2\pi\left(x' + \frac{y'}{2}\right)$$
(8)

Figure 7D:
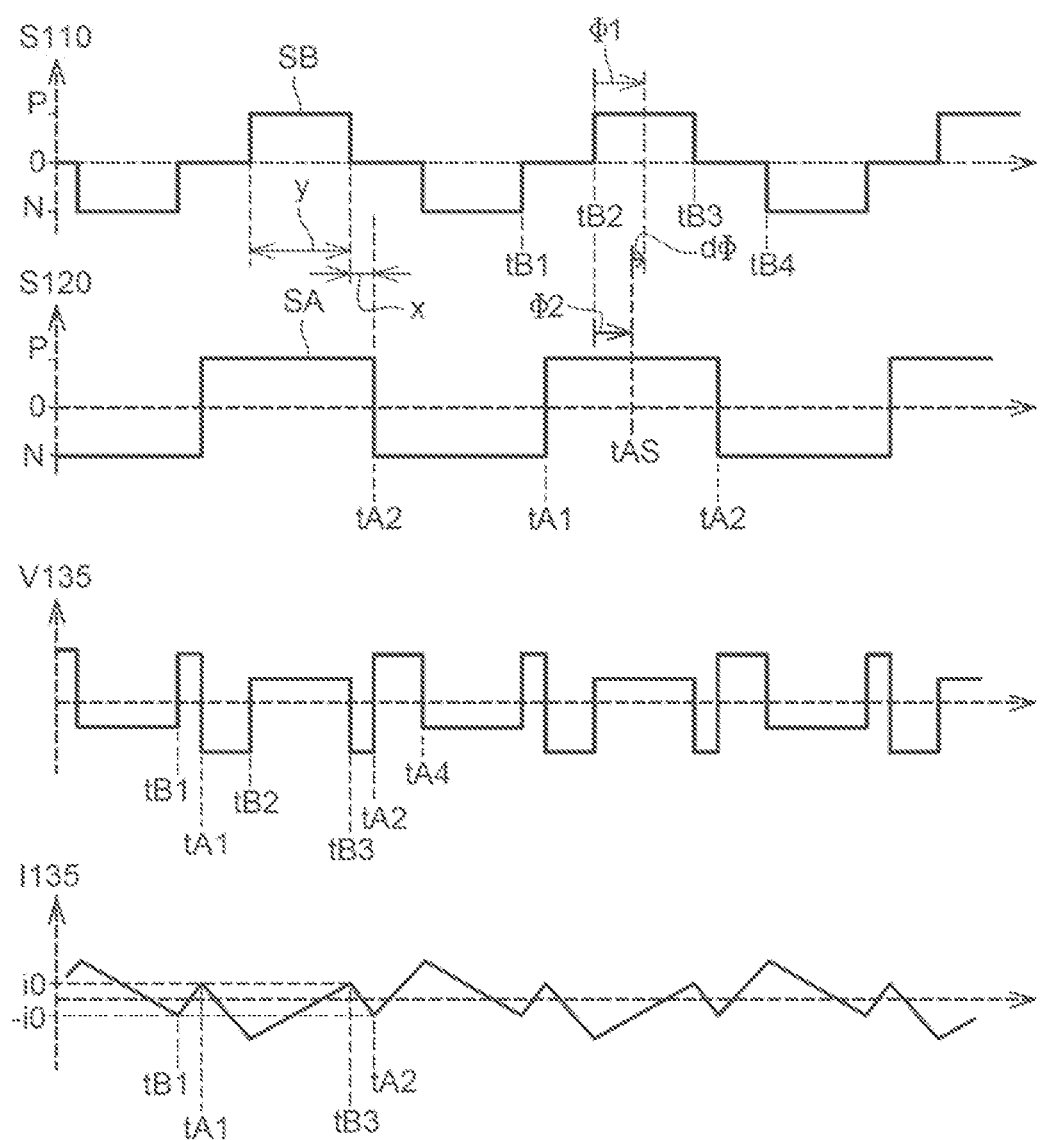
FIG. 7D schematically shows in the form of timing diagrams an embodiment of still another switched-mode converter control step.

At the step of FIG. 7D, as at that of FIG. 6D, the value of voltage n*V2 is smaller than that of voltage V1, and it is provided for the energy to flow from H bridge 120 to H bridge 110.

The sequence SB described hereabove in relation with FIG. 5 is applied to H bridge 110, and the sequence SA described hereabove in relation with FIG. 4 is applied to H bridge 120, repeatedly at the switching frequency.

The switching times tB1, tB2, tB3, and tB4 of sequence SB are defined with respect to times tA1 and tA2 of sequence SA by the two parameters x' and y' defined in relation with FIG. 7A.

Like the steps of FIGS. 7a, 7B, and 7C, the step of FIG. 7D is implemented in the second operating mode. In the present step, the switchings tB2 into and tB3 out of state P of sequence SB respectively occur in state P of sequence SA. The switchings tB4 into and tB1 out of state N of sequence SB occur in state N of sequence SA.

Preferably, switching time tA1 forms the reference time. The other switching times of sequences SA and SB are defined by phase shifts φ1 and φ2 and duty cycles D1 and D2.

Voltage V135 takes values −n*V2, n*V2−V1, V1−n*V2, and n*V2 when the respective states of sequences S120 and S110 are, respectively, N and O, P and P, N and N, and P and O, that is, respectively, between times tB1 and tB2, tB4 and tA1, tB2 and tA2, and tB3 and tB4. Sequences S120 and S110 respectively take states N and O, P and O, between times, respectively, tB1 and tA1, TB3 and TA2.

Preferably, the switching times of sequences SA and SB of the step of FIG. 7D are obtained:

from the parameters x' and y' of the step of FIG. 7A, in a way similar to that described to obtain the sequences SA and SB of the step of FIG. 7C from the parameters x1 and y1 of the step FIG. 6B; and/or from the parameters x1' and y1' of the step of FIG. 7C, in a way similar to that described to obtain the sequences SA and SB of the step of FIG. 6B from the parameters x and y of FIG. 6A.

Phase shifts φ1 and φ2, and duty cycles D1 and D2, are provided by the following equalities (9):

[Math 9]

$$D1 = y'$$
$$\varphi 1 = 2\pi\left(\frac{y}{2}\right)$$
$$D2 = 0.5$$
$$\varphi 2 = 2\pi\left(-\frac{1}{4} - x' + y'\right)$$
(9)

FIG. 8 schematically shows an example of a variation curve of a power according to control parameters. More specifically:

a curve 810 shows the variation of a power P transferred at step 6A by the converter from H bridge 110 to H bridge 120 according to parameter x; and a curve 810 shows the variation of a power P transferred at step 7A by the converter from H bridge 110 to H bridge 120 according to parameter x'.

According to a second aspect, the switching frequency, at which sequences SA and SB are repeated, is selected prior to the calculations of the switching times of sequences SA and SB. The second aspect may be provided in the absence of the first aspect, for example, only steps 6A and/or 7A are implemented or, still for example, parameters x1 and y1 and/or x1' and y1' are calculated independently from parameters x and y and/or x1' and y1'. The second aspect may also be combined with the first aspect, the switching frequency then being selected prior to the calculation of parameters x and y and/or x' and y', and then parameters x1 and y1 and/or x1' and y1' taking the values, respectively, of parameters x and y and/or x' and y'.

The modeled value P can then be determined for the predefined switching frequency according to a model of the converter of the power transferred by the converter from H bridge 110 to H bridge 120. The power shown according to parameters x, x' corresponds to this modeled value P.

In other words, according to this second aspect, a common switching frequency, that is, a switching frequency identical for all the switches of the two H bridges, is imposed.

Unlike in the solution described in Jauch et al.'s article mentioned hereabove, the converter of the solutions described in the present disclosure comprises two integrally controllable H bridges (having switches in the four branches) rather than a bridge having only one controllable half-bridge on the AC side. Above all, the present disclosure provides a solution enabling, by setting the switching frequency, that is, by making the switching frequency of the two bridges constant, to obtain the switching times from an analytic determination of parameters x and y according to voltages V1 and v2.

Based on the power set point P* defined in relation with FIG. 2, for example, varying as shown in FIG. 3, parameter x, x' is given a respective value x(P*), x'(P*) (in the shown example, parameter x takes value x(P*)). Value x(P*) is that of parameter x for which the modeled power P is equal to the power represented by set point P*. Parameter y is then given the value for which the currents modeled at switching times of the two sequences SA and SB are equal.

Preferably, in the converter model used, the leakage inductance of the transformer is a constant L independent from the current, the switchings are instantaneous, the voltage drops are zero in the conducting switches and in the connections, and the transformer windings have zero resistances.

As a result of this model, in the first operating mode, parameter y is calculated from parameter x and the following relation (10):

[Math 10]

$$y = \frac{1}{2} r_v (1 - 2x) \tag{10}$$

where $r_v$ stands for the value of the ratio V1/(n*V2) described in relation with FIG. 6B.

The power transmitted by the converter in average during cycle time Tc is given by the following relation (11):

[Math 11]

$$P = \frac{V_{v1} n V_{v2} (x - 2x^2 + y - 2y^2)}{2fL} \tag{11}$$

where f stands for the switching frequency, and $V_{v1}$ and $V_{v2}$ stand for respective values of voltages V1 and V2.

There results from relations (10) and (11) that power P verifies the following relation (12):

[Math 12]

$$r_p = -\frac{n}{2fL}(ax^2 + bx + c) \tag{12}$$

where $r_p$ stands for the value of a ratio P/(V1*V2) of the modeled power value P to voltages V1 and V2, and where a, b, and c stand for coefficients calculated from the following relations (13):

[Math 13]

$$a = 2 + 2r_v^2$$
$$b = -1 + r_v - 2r_p^2$$
$$c = -\frac{r_v}{2} + \frac{r_v^2}{2}$$
(13)

selected value of parameter x is that which verifies equation P*=P which, given relation (13), corresponds to the following equation (14):

[Math 14]

$$ax^2 + bx + c + \frac{2fL}{n}r_p^* = 0 \tag{14}$$

where $r_p^*$ stands for the value of ratio P*/(V1*V2) described in relation with FIG. 6B. Equation (14) corresponds to a quadratic equation.

When set point P* is smaller than a maximum value P1H, equation (14) has two solutions. The smallest of the two solutions is selected as the value of parameter x. This choice enables, as compared with the selection of the largest of the two solutions, to limit the value of current I135 in the transformer, which limits various problems of transformer sizing, energy loss in the transformer, and/or saturation of ferromagnetic elements of the transformer.

The value of parameter x is thus calculated by the following relation (15):

[Math 15]

$$x = \frac{-b - \sqrt{\Delta}}{2a} \tag{15}$$

where Δ stands for a value calculated by the following relation (16):

[Math 16]

$$\Delta = b^2 - 4a\left(c + \frac{2fL}{n}r_p^*\right) \tag{16}$$

Value Δ being positive when set point P* is smaller than the value P1H given by the following relation (17):

[Math 17]

$$P1H = V_{v1} V_{v2} \frac{n}{2fL}\left(\frac{b^2}{4a} - c\right) \tag{17}$$

The value of parameter x is in the range from 0 to 0.5. The solution to equation 15 satisfies this condition when set point P* is greater than a minimum value PL1 reached for the zero value of parameter x. Minimum value P1L may be calculated by the following relation (18):

[Math 18]

$$P1L = -V_{v1}V_{v2}\frac{n}{2fL}c \qquad (18)$$

Values P1L and P1H form respective maximum and minimum values transferrable by the converter in the first operating mode when voltages V1 and V2 take values $V_{V1}$ and $V_{V2}$. For any value of set point P* located between maximum value P1H and minimum value P1L, parameter x is calculated from relations (13), (14), and (16), from the previously-defined switching frequency, and from the values of voltages V1 and V2. Relations (13), (14), and (16) provide a same value of parameter x, for different values of voltages V1 and V2 and of set point P*, when ratio $r_p$* takes a same value and ratio $r_v$ takes a same value.

Parameter y is then calculated by relation (10), after which the switching times of sequences SA and SB are determined as discussed hereabove in relation with FIGS. 6A to 6D. Sequences SA and SB are applied to bridges 110 and 120, which causes the transfer between bridges of a power preferably substantially equal, more preferably equal, to set point P.

In the second operating mode, parameters x' and y' are calculated in a way similar to that described hereabove for the first operating mode. Power P verifies the following relation (19):

[Math 19]

$$r_p = \frac{n}{4fL}r_v(a'x'^2 + b'x' + c') \qquad (19)$$

where coefficients a', b', and c' are calculated from the following relations (20):

[Math 20]

$a'=4(2-r_v)$ $b'=4r_v-6$ $c'=1-r_v \qquad (20)$ indicated hereabove, the selected value of parameter x' is that which verifies equation P*=P, which corresponds to the following equation (21):

[Math 21]

$$a'x'^2 + b'x' + c' - \frac{4fL}{n}\frac{1}{r_v}r_p^* = 0 \qquad (21)$$

When set point P* is greater than a minimum value P2L, equation (21) has two solutions. The smallest of the two solutions is selected as the value of parameter x'. As in the first operating mode, this selection enables, as compared with the selection of the largest of the two solutions, to limit the value of current I135 in the transformer.

The value of parameter x' forming the solution of equation (21) is then calculated by using the following relation (22):

[Math 22]

$$x = \frac{-b' - \sqrt{\Delta'}}{2a'} \qquad (22)$$

where Δ' stands for a value calculated by the following relation (23):

[Math 23]

$$\Delta' = b'^2 - 4a'\left(c' - \frac{4fL}{n}\frac{1}{r_v}r_p^*\right) \qquad (23)$$

Value Δ is positive when power P* is smaller value P2L given by the following relation (24):

[Math 24]

$$P2L = -V_1^2\frac{1}{4fL}\left(\frac{b'^2}{4a'} - c'\right) \qquad (24)$$

Further, the value of parameter x is in the range from 0 to 0.5. The solution to equation (21) satisfies this condition when set point P* is smaller than a maximum value P2H reached for the zero value of parameter x'. Minimum value P2H may be calculated by the following relation (25):

[Math 25]

$$P2H = V_1^2\frac{1}{4fL}c' \qquad (25$$

By application to relations (25) and (18) of the respective relations (13) and (20) verified by respective coefficients c and c', equality P1L=P2H is obtained for same values of voltages V1 and V2 and a same value of the switching frequency.

The switching times of sequences SA and SB are determined as discussed hereabove in relation with FIGS. 7A to 7D. Sequences SA and SB are applied to bridges 110 and 120, which causes the transfer between bridges of a power preferably substantially equal, more preferably equal, to set point P*.

A power transfer between H bridges 110 and 120 corresponding to power set point P* has thus been obtained in the example of FIG. 8.

According to an embodiment, switching frequency f, common to the repetitions of sequences SA and SB, has a constant predefined value. As an example, the switching frequency is in the range from 20 kHz to 150 kHz, preferably equal to approximately 100 kHz, more preferably equal to 100 kHz.

According to another embodiment, frequency f is calculated, prior to the calculation of the values of parameters x and y and/or x' and y', from the values of voltages V1 and V2 of power set point P*. The values of parameters x and y and/or x' and y' are then calculated, preferably as described hereabove.

For this purpose, in the first operate mode, preferably, the minimum and maximum power values P1L and P1H are calculated from the values of voltages V1 and V2 and of set point P. The switching frequency for which set point P* is located in predefined fashion between values P1L and P1H, preferably the frequency for which set point P* is equal to the average of values P1L and P1H, or for example to a weighted average between values P1L and P1H, is then selected.

In the example of the above-described model, coefficients a, b, c are calculated from voltages V1 and V2 and set point P* by using relations (13), after which the switching frequency f for which the following equality (26) is verified is calculated:

[Math 26]

$$P^* = \frac{1}{2}(P1L + P1H) \tag{26}$$

Where values P1L and P1H are provided according to frequency f respectively by relations (18) and (17). In other words, equality (26) is an equation having frequency f as a solution. This equation may be solved by an algebraic relation providing frequency f according to the values of voltages V1 and V2 and of set point P.

In the second operating mode, the switching frequency is calculated in a way similar to that described hereabove for the first operating mode. For example, by using relations (20), (24), and (25), to obtain the following equality (27), which forms an equation:

[Math 27]

$$P^* = \frac{1}{2}(P2L + P2H) \tag{27}$$

A range of values between a minimum frequency and a maximum frequency may be defined for the switching frequency. The value of switching frequency f verifying equality (26) or (27) is calculated. When the frequency value thus calculated is greater than the maximum frequency, the switching frequency is given the value of the maximum frequency. When the calculated frequency value is smaller than the minimum frequency, the switching frequency is given the value of the minimum frequency. When the calculated frequency value is within the range, this value is selected as the switching frequency value.

In other words, the power set point is then located in the middle of a modeled range of the power values transferrable by the converter.

In practice, after the application of sequences SA and SB, the transferred power may differ from set point P*. Power set point P* may then be adjusted, for example, by a regulation loop, to obtain the desired converter operation, for example, to obtain the desired PFC function and/or to obtain for the power supplied by the converter to correspond to the desired average over a full wave of the voltage. The fact of locating the power set point in the middle of the modeled range of the transferable powers enables to avoid various problems of operation of the regulation loop to provide robustness to the converter operation.

According to still other embodiments, apart from the second aspect, the steps of FIGS. 6A and/or 7A may be implemented without selecting the switching frequency prior to the calculation of parameters x and y and/or x' and y', that is, without selecting switching frequency f prior to the calculation of the switching times of sequences SA and SB.

For example, it could be provided, in a relation such as relation (11) hereabove providing the modeled power value, to give parameter x and/or y a value depending on switching frequency f by a predefined relation. The frequency f and the parameter x and/or y for which the modeled power and the supplied power are equal would then be simultaneously searched for. However, it would then be difficult, or even impossible, to obtain frequency f and parameters x and y by algebraic relations such as relations (13), (15), (16). Means of numerical resolution, for example, by successive iterations, would then have to be used.

As a comparison, according to the second aspect, the fact of defining the switching frequency prior to the calculation of the switching times of sequences SA and SB enables to obtain parameters x and y in a way particularly simple to be implemented and/or fast to be executed by a control circuit such as circuit 180 (FIG. 1).

The calculation of parameters x and y has been described hereabove by using a specific example of model of the converter. It will be within the abilities of those skilled in the art, based on this example, to adapt the above-described calculation steps to other models of the converter, for example, taking resistors into account.

In particular, it will be within the abilities of those skilled in the art to only keep the relevant elements of the converter model which enable to reach, once the switching frequency is predefined, algebraic expressions providing control parameters such as parameters x and y.

Similarly, based on the above-described calculation steps, it will be within the abilities of those skilled in the art to obtain the calculation steps based, instead of the desired equality between currents in the transformer during the switchings of the two sequences, on any other relation between the currents at times placed in predefined fashion in the switching sequences.

In particular, it will be within the abilities of those skilled in the art to select a desired relation between currents enabling to reach, once the switching frequency is predefined, algebraic expressions providing control parameters such as parameters x and y.

Figure 9:
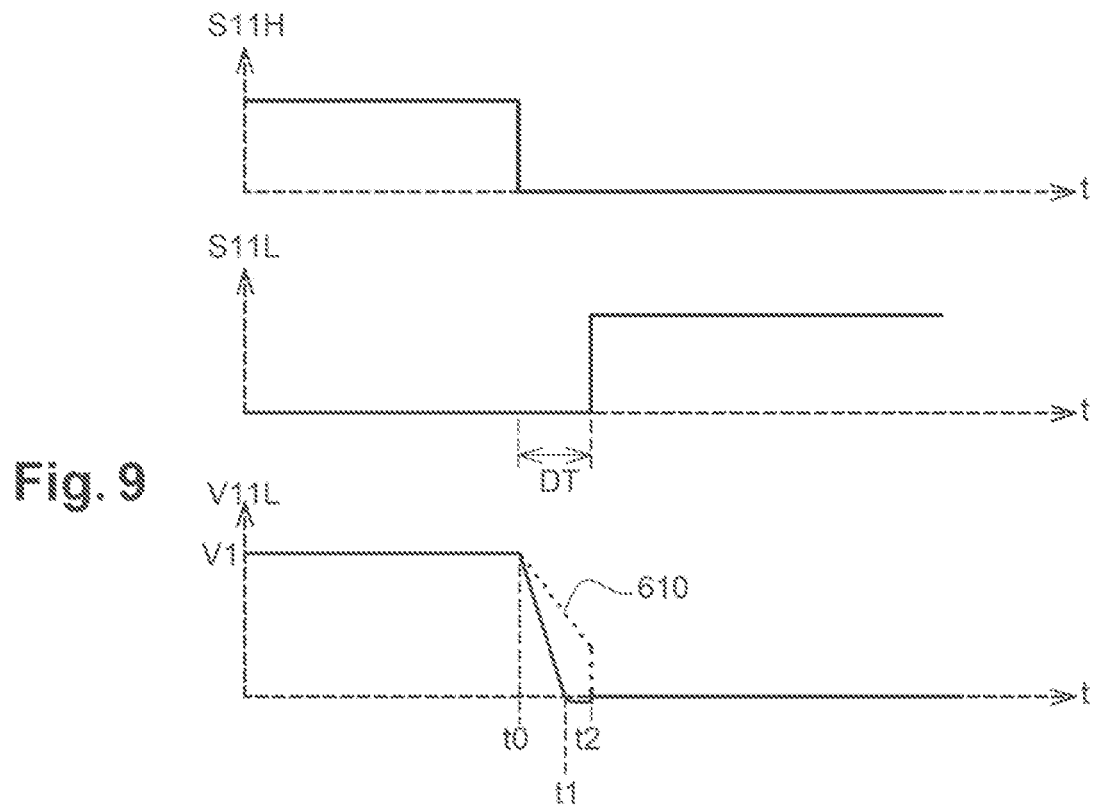
FIG. 9 schematically shows in the form of timing diagrams an example of switching of switches of a converter.

FIG. 9 schematically shows in the form of timing diagrams an example of switching of switches of a converter branch, such as switches T11H and T11L of the converter 100 of FIG. 1. In particular, FIG. 9 shows variation curves according to time t:
of a signal S11H for controlling switch T11H;
of a signal S11L for controlling switch T11L; and
of a voltage V11L across switch T11L.

Each of signals S11H and S11L has a high level and a low level, corresponding to settings to the respective on and off states of the concerned switch.

The switching comprises a given dead time of duration DT. Duration DT may be obtained in any usual way of obtaining a switching dead time duration. As an example, the dead time has a predefined constant duration in the range from 5 ns to 200 ns.

Before the switching, signal S11H is at its high level, and signal S11L is at its low level. Switch T11L is in the off state. Switch T11H is in the on state and applies a voltage, for example, equal to V1, across switch T11L.

At a switching start time t0, switch T11H switches to the off state. Time t0 may correspond to one of the switching times defined hereabove for sequences SA and SB.

The voltage across switch T11L is initially equal to V1 at the beginning of the dead time. This voltage corresponds to the charge of various stray capacitive elements of switch T11L. During the dead time, these capacitive elements are discharged by current I135 (FIG. 1) into the leakage inductance 135 (FIG. 1) of transformer 130. The higher the current in leakage inductance 135, the more the voltage across switch T11L decreases slowly. Further, the higher the energy stored in leakage inductance 135, the longer this decrease is likely to last.

At a time t1, voltage V11L turns to zero and then settles at a negative value corresponding, for example, to a voltage of a diode in parallel with switch T11L. The diode is for example formed by doped semiconductor regions forming a field-effect transistor comprised within switch T11L.

At a time t2, the dead time has elapsed, and a switching of signal T11L from its low state to its high state marks the end of the switching. Switch T11L is turned on while the voltage thereacross is substantially zero, to within a voltage drop in the diode. A ZVS-type switching ("Zero Voltage Switching") has thus been obtained. ZVS-type switchings enable to decrease energy losses in the switches.

However, when the current in the inductance is smaller than a current threshold $I_{ZVS}$, it may occur, as shown by dotted lines 610, that the stray capacitive elements is not fully discharged at the end of the dead time. The determination of current threshold $I_{ZVS}$ may be calculated, according to values of the leakage inductance of the stray capacitive elements of the switches, by any usual step of calculation of a current threshold beyond which the current in the inductance is sufficient to obtain ZVS-type switchings.

Back to FIG. 8, in the first operating mode (curve 810), the values (i0, FIGS. 6A to 6D) of current I135 common to switchings of sequences SA and SB, are greater than threshold $I_{ZVS}$ when parameter x is greater than a value $x_{ZVS}$. Similarly, in the second operating mode (curve 820), the values i0 of current I135 are greater than threshold $I_{ZVS}$ when parameter x' is greater than a value $x'_{ZVS}$.

The sequences SA and SB obtained as described hereabove from voltages V1 and V2 and from set point P*, allow ZVS-type switchings when the power represented by set point P* is in the range:

in the first operating mode, from a minimum value $P1L_{ZVS}$ greater than value P1L to maximum value P1H; and in the second operating mode, from minimum value P2L to a maximum value $P2H_{ZVS}$ smaller than value P2H.

According to an embodiment, the operating frequency is selected, preferably before the calculation of parameters x and y:

in the first operating mode, so that power set point P* is located in predefined fashion, for example, equal to the average, between values $P1L_{ZVS}$ and P1H; and/or in the second operating mode, so that power set point P* is located in predefined fashion, for example, equal to the average, between values P2L and $P2H_{ZVS}$.

In other words, the power represented by set point P* is located in predefined fashion between:

the estimated limiting value P1H or P2L of transferable power according to parameters x and y; and the modeled, or estimated, value of the power, respectively $P1L_{ZVS}$ and $P2H_{ZVS}$, for which the value i0 of current I135 is equal to current threshold $I_{ZVS}$.

The switching frequency is thus selected so that the power set point is located in the middle of the modeled range of the powers transferable by ZVS-type switchings. This enables, as discussed hereabove, to avoid various problems of operation of a regulation loop adjusting set point P*, while enabling the switchings to be of ZVS type.

Figure 10:
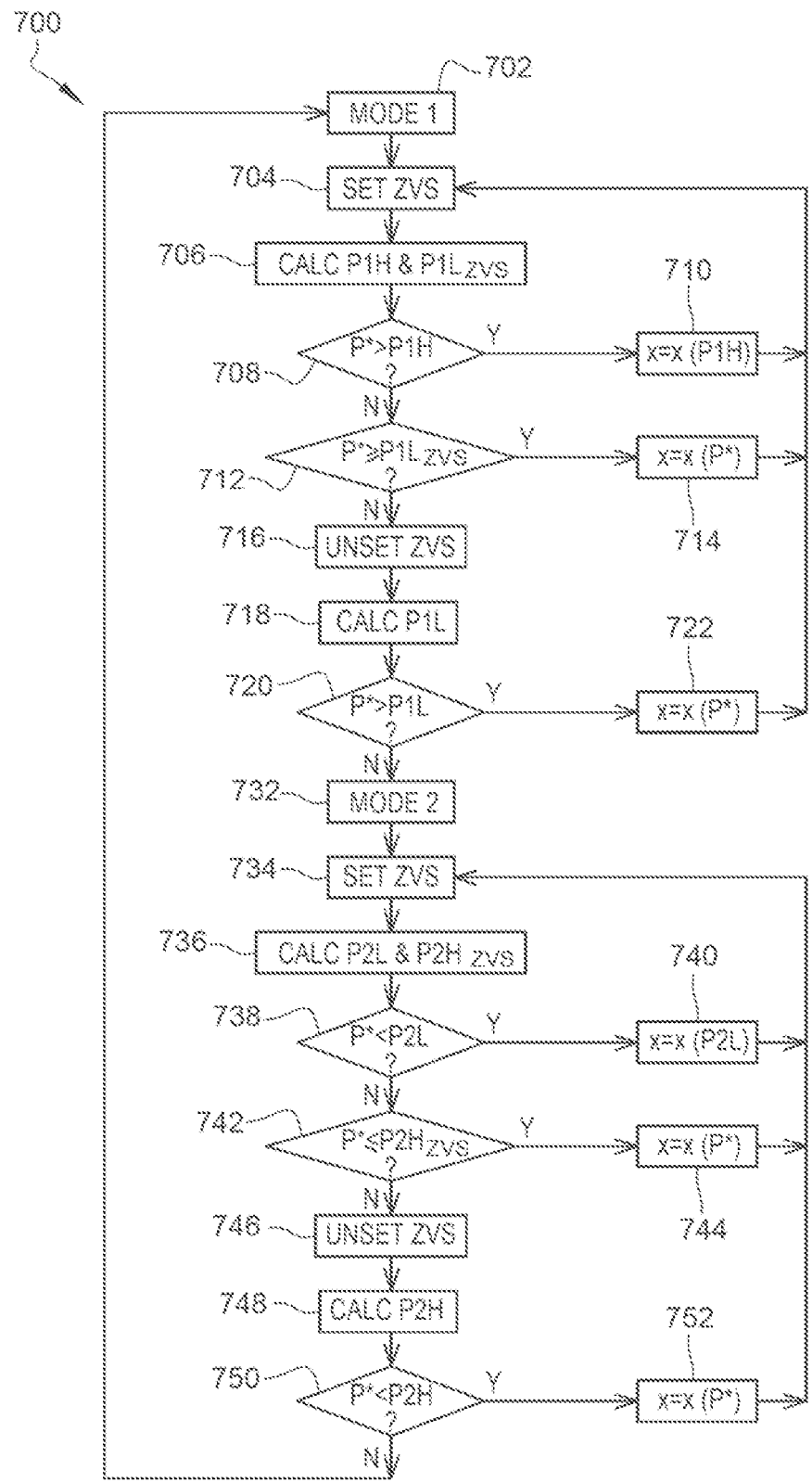
FIG. 10 schematically shows in the form of blocks an embodiment of a converter control method.

FIG. 10 schematically shows in the form of blocks an embodiment of a method 700 of controlling a converter of the type of the converter 100 of FIG. 1. The method may be implemented, for example, by a control circuit such as circuit 180 (FIG. 1). This method is for example implemented at step 220 (FIG. 2) of obtaining of the switching sequences from voltages V1, V2 and set point P*.

Method 700 is preferably executed when voltage V1 and/or voltage V2 is an AC voltage. More preferably, voltage V1 is an AC voltage and voltage V2 is a DC voltage, and set point P* is calculated as described in relation with FIG. 3.

At a step 702 (MODE 1), the converter switches to the first operating mode. After this, at a step 704 (SET ZVS), it is provided for the converter to operate so that the switchings are of ZVS type. The next steps of the first operating mode are implemented, preferably, for the measured values of voltages V1 and V2 and for set point P*.

At a step 706 (CALC P1H & $P1L_{ZVS}$), for example following step 704, values P1H and $P1L_{ZVS}$ are calculated as described hereabove in relation with FIGS. 8 and 9. In an example, it is provided for the switching frequency to be calculated as described hereabove according to values $P1L_{ZVS}$ and P1H. In another example, the switching frequency is constant.

At a step 708 (P*>P1H?) following step 706, power set point P* is compared with value P1H. If set point P* is greater than value P1H (Y), the method proceeds to a step 710 (x=x(P1H)) at which, for parameter x, the value x(P1H) for which power P is maximum, that is, equal to value P1H, is selected. If set point P* is smaller than or equal to value P1H (N), the method proceeds to a step 712.

At step 712 (P*>$P1L_{ZVS}$?), power set point P* is compared with value $P1L_{ZVS}$. If set point P* is greater than or equal to value $P1L_{ZVS}$ (Y), the method proceeds to a step 714 (x=x(P*)) at which parameter x is given the value x(P*) for which the power represented by set point P* is equal to the modeled power P, for example, as described in relation with FIG. 8. If set point P* is smaller than value $P1L_{ZVS}$ (N), the method proceeds to a step 716.

At step 716 (UNSET ZVS), it is provided for the conditions for the switchings to be of ZVS type not to be completely fulfilled.

At a step 718 (CALC P1L), for example, following step 716, value P1L is calculated. In an example, it is provided for the switching frequency to be calculated as described hereabove according to values P1L and P1H. In another example, the switching frequency remains constant.

At a step 720 (P*>P1L?), set point P* is compared with value P1L. If set point P* is greater than value P1L (Y), the method proceeds to a step 722 (x=x(P*)) at which parameter x is given the value x(P*) for which the power represented by set point P* is equal to the modeled power P, for example, as described in relation with FIG. 8. If set point P* is smaller than or equal to value P1L (N), the method proceeds to a step 732.

As an example, once the value of parameter x is calculated at step 710, 714, or 722, the method returns to step 704, to continue with new values of set point P* and of voltages V1 and V2.

At step 732 (MODE 2), the converter switches to the second operating mode. After this, at a step 734 (SET ZVS), it is provided for the converter to operate so that the switchings are of ZVS type. The next steps of the second operating mode are implemented, preferably, for the measured values of voltages V1 and V2 and for set point P*.

At a step 736 (CALC P2L & $P2H_{ZVS}$), for example, following step 734, values P2L and $P2H_{ZVS}$ are calculated as described hereabove in relation with FIGS. 8 and 9. In an example, it is provided for the switching frequency to be calculated according to values $P2H_{ZVS}$ and P2L. In another example, the switching frequency remains constant and of same value as during the first operating mode.

At a step 738 (P*<P2L?) following step 736, power set point P* is compared with value P2L. If set point P* is smaller than value P2L (Y), the method proceeds to a step 740 (x=x(P2L)) at which, for parameter x, the value x(P2L) for which power P is maximum, that is, equal to value P2L, is selected. If set point P* is greater than or equal to value P2L (N), the method proceeds to a step 742.

At step 742 (P*<P2H$_{ZVS}$?), power set point P* is compared with value P2H$_{ZVS}$. If set point P* is greater than value P2H$_{ZVS}$ (Y), the method proceeds to a step 744 (x=x(P*)) at which parameter x is given the value x(P*) for which the power represented by set point P* is equal to the modeled power P, for example, as described in relation with FIG. 8. If set point P* is greater than value P2H$_{ZVS}$ (N), the method proceeds to a step 746.

At step 746 (UNSET ZVS), it is provided for the conditions for the switchings to be of ZVS type not to be completely fulfilled.

At a step 748 (CALC P2H), for example, following step 746, value P2H is calculated. For example, it is provided for the switching frequency to be calculated as described hereabove according to values P2H and P2L. As a variant, the switching frequency remains constant.

At a step 750 (P*<P2H?), set point P* is compared with value P2H. If set point P* is smaller than value P2H (Y), the method proceeds to a step 752 (x=x(P*)) at which parameter x is given the value x(P*) for which the power represented by set point P* is equal to the modeled power P, for example, as described in relation with FIG. 8. If set point P* is smaller than or equal to value P2H (N), the method returns to step 702.

Figure 11A:
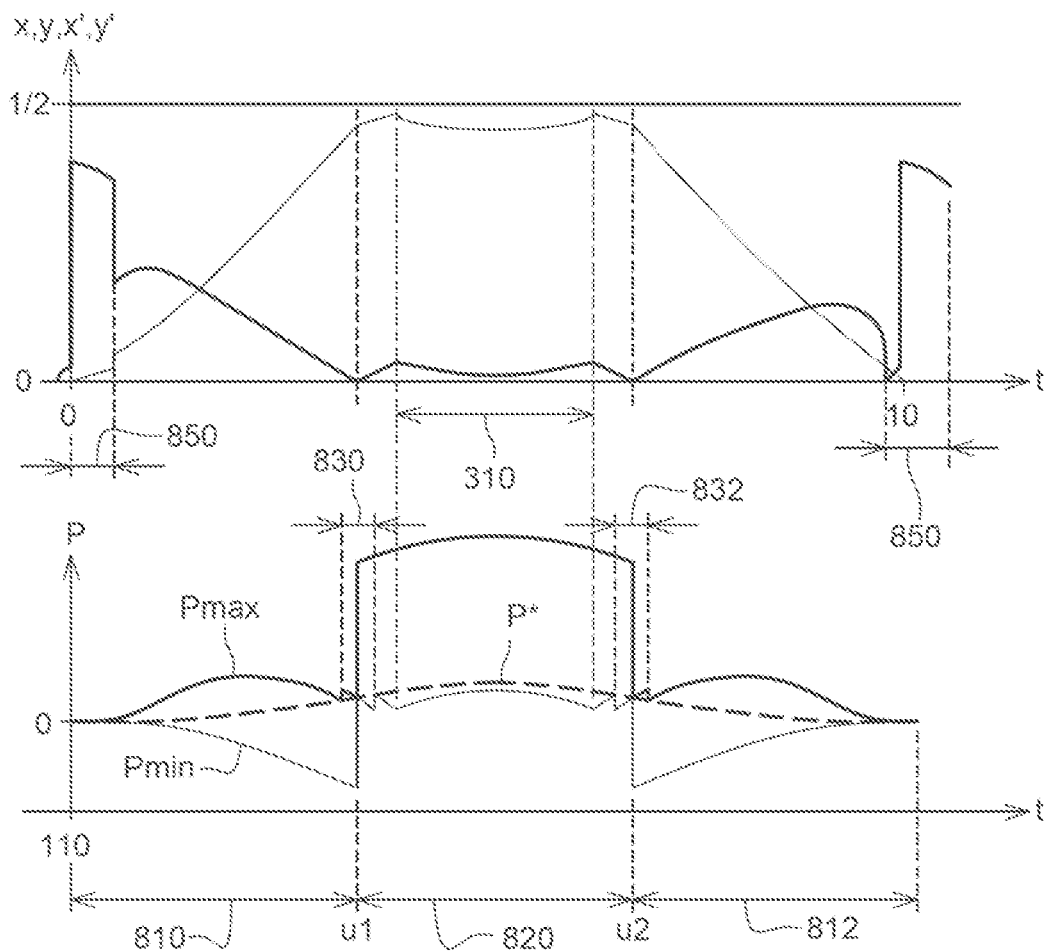
FIG. 11A schematically shows in the form of timing diagrams variation curves of control parameters and of power according to time during an example of implementation of the method of FIG. 10.
Figure 11B:
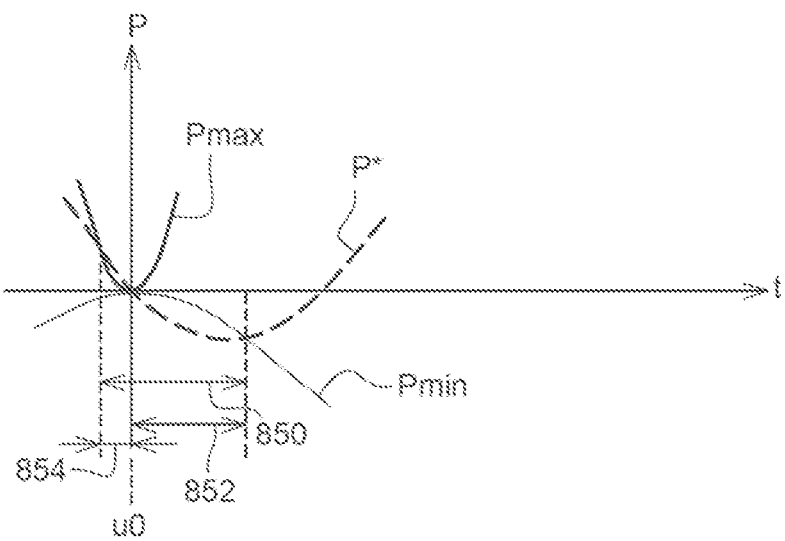
FIG. 11B schematically shows at a different scale variation curves of the powers of FIG. 11A.

FIG. 11A schematically shows in the form of timing diagrams, variation curves of parameters x, y, x', y' and of powers Pmax, P, and Pmin (P) according to time t. FIG. 11B schematically shows, at a different scale, variation curves of the powers of FIG. 11A around a time u0.

More precisely, the shown timing diagrams correspond to a halfwave of voltage V1 starting at time u0. Voltage V2 is a DC voltage in the shown example. The control parameters are shown between 0 and ½. The switching frequency is constant in this example.

The sequences SA and SB described in relation with FIGS. 4 and 5 are applied to H bridges 110 and 120, preferably as described in relation with FIGS. 6A and 6B for the first operating mode, and with FIGS. 7A and 7B for the second operating mode. Sequences SA and SB, repeated at a switching frequency greater than that of AC voltage V1, vary during the halfwave according to parameters x, y and x' and y'.

According to a third aspect, it is provided, during a same halfwave of the AC voltage across H bridge 110, at a period 810, for the converter to operate according to the second operating mode and, at a period 820, for the converter to operate according to the first operating mode.

In the shown example, this is obtained by the implementation of the method of FIG. 10. Powers Pmin and Pmax are respectively defined by the minimum and maximum powers for each operating mode, that is:

during the first operating mode, power Pmax takes value P1H. Power Pmin takes value P1L when the conditions for the switchings to be of ZVS type are not completely fulfilled, and value P1L$_{ZVS}$ when these conditions are fulfilled; and during the second operating mode, power Pmin takes value P2L. Power Pmax takes value P2H when the conditions for the switchings to be of ZVS type are not completely fulfilled, and value P2H$_{ZVS}$ when these conditions are fulfilled.

During period 810, set point P* is smaller than value P2H. At the end of period 810, set point P* approaches value P2H, after which set point P* crosses value P2H, that is, temporarily takes a value equal to or greater than power P2H. This causes the transition to the first operating mode.

During period 820, set point P* is smaller than value P2H. At the end of period 820, set point P* approaches value P1L, after which set point P* crosses value P1L, that is, temporarily takes a value equal to or smaller than power P1L. This causes the transition to the second operating mode. The second operating mode carries on during a period 812.

In the shown example, these transitions between operating modes are obtained by the method of FIG. 10. The transition from the first operating mode to the second operating mode results from the comparison between set point P* and value P1L performed at step 720. The transition from the second operating mode to the first operating mode results from the comparison between set point P* and value P2H performed at step 750. This enables to obtain an equality between set point P* and the modeled power P for any value of set point P* between the minimum transferable power value P2L of the second operating mode and the maximum transferable power value P1H of the first operating mode.

In other examples, one may use, instead of the method of FIG. 10, any method enabling to obtain, in the same halfwave of the AC voltage, periods during which the first operating mode is implemented and periods during which the second operating mode is implemented, so that set point P* remains equal to the modeled power P for any value of set point P* between P2L and P1H.

It may be provided, as in the example of FIG. 10, for period 810 to end, preferably, when set point P* crosses maximum value P2H, and for period 820 to end, preferably, when set point P* crosses minimum value P2L. However, this is not limiting, and it may be provided for transitions from one period to the other to be started in any other way enabling to ensure for set point P* to be, in the first operating mode, between values P1L and P1H, and, in the second operating mode, between values P2L and P2H.

In particular, in embodiments according to which the switching frequency is variable during the halfwave, it may be provided for time u1 of transition from the second operating mode to the first operating mode, and/or time u2 of transition from the first operating mode to the second operating mode to be that at which the switching frequency becomes equal, respectively to the minimum and/or maximum frequency of the range of frequency values defined hereabove in relation with FIG. 8.

In the example where switching frequency value f is, during period 820 of operation according to the first mode, a solution of equation (26) (between P*, P1L and P1H, values P1H and P1L being provided according to frequency f by relations (17) and (18)), time u2 may correspond to that at which frequency f reaches the maximum frequency. For this purpose, in relations (17) and (18), frequency f is replaced with the minimum frequency. Voltages V1, V2 may be modeled according to time t, for example, with a sinusoidal voltage V1 and a constant voltage V2. Set point P* may also be modeled according to time t, for example as described hereabove in relation with FIG. 3. Relations (17) and (18) then provide values P1H and P1L according to time t. The following equation (28) is obtained:

[Math 28]

$$P^*(t) = \frac{1}{2}(P1L(t) + P1H(t)) \quad (28)$$

Corresponding to equation (26) where time t is the unknown. The value of time t which is the solution of equation (28) is given at time u1.

Time u2 may be calculated similarly in the example where the switching frequency value, during period 820 of operation according to the first mode, is a solution of equation (27) (between P*, P2L and P2H). The above described calculation is implemented by replacing equation (26), relations (17) and (18), values P1L and P1H, and the maximum frequency of the range with, respectively, equation (27), relations (24) and (25), values P2L and p2H, and the minimum frequency of the range.

In the shown example where the method of FIG. 10 is implemented, at a period 830 astride periods 810 and 820, and at a period 832 astride periods 820 and 812, the calculations of the switching times are performed independently from current threshold $I_{ZVS}$. This results from steps 716 and 746 (FIG. 10).

In other examples, the method of FIG. 10 may be replaced with any method adapted to performing, during period 830 and/or 832, the calculations of the switching times independently from current threshold $I_{ZVS}$. The fact of providing such periods enables to obtain an equality between set point P* and the modeled power P, including when set point P* is between values $P2H_{ZVS}$ and P2H and/or between values P1L and $P1L_{ZVS}$.

In the shown example, outside of periods 830 and 832, that is, in central portions of periods 810, 820, and 812, the calculations of the switching times are such that the modeled value of the current in the transformer at the switching times is greater than current threshold $I_{ZVS}$, so that the switchings may be of ZVS type.

In other examples, the method of FIG. 10 may be replaced with any method adapted to providing, during at least the central portions of periods 810 and 820, the switching times based on a modeled value of the current in the transformer greater than threshold $I_{ZVS}$. ZVS-type switchings can then advantageously be obtained by applying a dead time such as that described in relation with FIG. 9.

During a period 310, the value of voltage V1 is greater than value n*V2. During this period, voltage V1 has a value smaller than value n*V2.

In the shown example, period 310 is entirely located in period 820. Thus, when the operation is according to the second embodiment, voltage V1 has a value smaller than value n*V2. In this example, the step of FIG. 7A is preferably implemented in the second operating mode.

In the shown example, during period 820, that is, when the operation is according to the first mode, the step of FIG. 6A is preferably implemented outside of period 310 and the step of FIG. 6B is preferably implemented during period 310. The transition from the step of FIG. 6A to that of FIG. 6B is performed when sum x+y of parameters x and y (FIG. 6A) is temporarily equal to 0.5. At this transition, the duration of states O of sequence SB becomes null. As a result, sequence SB becomes temporarily identical to sequence SA, to within a phase shift equal to d☐ (FIG. 6A) between the two sequences. The duty cycle of sequence SB is then equal to 0.5. The control of the power transfer between bridges is thus, temporarily, of phase-shift control type between the two sequences SA and SB, each comprising two cycles inverse to each other and having a duty cycle equal to 0.5. The transition from the step of FIG. 6B to that of FIG. 6A is performed similarly.

In another example, period 820 may be entirely located within period 310, and portions of period 310 may be located at the end of period 810 and/or at the beginning of period 812. As a result, the step of FIG. 6B is implemented when the operation is according to the first mode. When the operation is according to the second mode, the step of FIG. 7A is implemented outside of period 310 and the step of FIG. 7B is implemented during the concerned portions of period 310.

At transitions from the step of FIG. 7A to that of FIG. 7B, and/or from the step of FIG. 7B to that of FIG. 7A, the sum x'+y' of parameters x' and y' (FIGS. 7A and 7B) is temporarily equal to 0.5. In the same way as for transitions from the steps of FIGS. 6A and/or 6B to those, respectively, of FIGS. 6B and/or 6A, this results in that the bridge control is temporarily of phase-shift control type at transitions from the steps of FIGS. 7A and/or 7B to those, respectively, of FIGS. 7B and/or 7A.

In still another example, voltage V1 remains smaller than value n*V2 during the halfwave. There is no period 310.

At times u0 marking transitions between consecutive halfwaves of voltage V1, voltage V1 becomes zero. As a result, values Pmin and Pmax cross, in absolute value, a minimum value equal to zero. Accordingly, set point P* is, during a period 850, outside of the range of transferrable powers between values Pmin and Pmax. More particularly, period 850 is formed of a period 852 following time u0 and of a period 854 preceding time u0.

During period 852, the second operating mode may be implemented. Minimum value Pmin takes value P2L. Set point P* is smaller than value P2L. step 740 (FIG. 10) is implemented. The power supplied by the converter corresponds to power Pmin.

During period 854, the first operating mode may be implemented. In other words, the first operating mode may be implemented during the two separate periods 820 and 854 during the same halfwave. Minimum value Pmax takes value P1H. Set point P* is greater than value P1H. step 710 (FIG. 10) is implemented. The power supplied by the converter corresponds to power Pmax.

As a variant, the second operating mode could be implemented during period 854, in other words, period 812 and period 810 of the next halfwave, not shown, could form a period of application of the second operating mode only. As compared with this variant, the application of the first operating mode during period 854 enables to bring set point P* closer to the power transferred in practice by the converter, which enables to improve the PFC function carried out by the converter.

Embodiments according to the third aspect, according to which the first and second operating modes are applied to two periods of a same halfwave, have been described in relation with FIGS. 11A and 11B.

Preferably, during the implementation of this third aspect, the switching times of the sequences SA and SB of steps 6A and 6B or 7A and 7B are calculated according to the first aspect, that is, from the same values of the parameters, respectively x and y or x' and y'. However, instead of the calculation according to the first aspect, any calculation step enabling to define the bridge switching times may also be implemented.

Preferably, during the implementation of this third aspect, the switching frequency is predefined according to the second aspect. However, the switching frequency may also be defined at the same time as the bridge switching times.

Further, embodiments where the first aspect and/or the second aspect are applied to the specific case of an AC voltage V1 and of a DC voltage V2 have been described hereabove. However, in other embodiments, the first aspect and/or the second aspect may be implemented when voltage V1 is a DC voltage and/or when voltage V2 is an AC voltage.

FIG. 12 schematically shows an example of a variation curve of an inductance L (in H) according to current I135 (in A), according to an embodiment.

According to the present embodiment, it is provided for value L of the leakage inductance to decrease when the current I135 in the leakage inductance, that is, in winding 131 (FIG. 1) of transformer 130, increases in absolute value. In other words, value L is relatively high when current I135 is relatively low and relatively low when current I135 is relatively high.

As an example, leakage inductance 135 is provided so that its value is substantially divided by two when current I135 switches from the zero value of current I135 to a maximum value of current I135. In the shown example, inductance L is close to 10 H for the zero value of current I135, and the maximum value of current I135 is in the order of 80 A. The maximum value may correspond to a maximum value reached by current I135 when the converters is in operation, for example, in the first operating mode.

A leakage inductance having its value thus decreasing according to the current can be obtained, for example, by providing in the inductance a magnetic circuit configured to saturate when the current increases, so as to cause the desired variation of the value of the leakage inductance according to the current.

In operation, for example, during steps similar to those of FIGS. 6A to 6B and 7A to 7D, the variations of current I135 according to time t differ from those shown in these drawings by variations of the current having an amplitude increasing when the value of current I135 diverges from zero.

According to an embodiment, the switching frequency is selected prior to the calculation of the switching times. More preferably, the switching times are defined from the parameters x and y and/or x' and y' described in relation with FIGS. 6A to 6D and 7A to 7D.

For each set of values of voltages V1 and V2, the average modeled power P at each repetition of the switching sequences can then be calculated according to parameters x and y, from a model of the converter. In the present embodiment, the converter model takes into account the above variations of the value L of leakage inductance 135 according to current I135.

For this purpose, as an example, current I135 is determined according to time by using variations of voltage V135, for example, identical to those described in FIGS. 6A to 6D and 7A to 7D and based on values of parameters x and/or y, or x' and/or y'. The modeled values of the current according to time may be calculated numerically. A modeled instantaneous power value may be numerically deduced from the values of voltage V135 and of current I135. Modeled power P corresponds to the average, over a switching sequence, of the instantaneous power. This results in the modeled value P of the power according to parameters x and/or y or x' and/or y'. The switching frequency may be calculated previously, and/or be the solution of an equation of the type of equation (26) or (27).

For each of the first and second operating modes, the variation curve of modeled power P is similar to that shown in FIG. 8 for this operating mode. Parameters x and/or y, or x' and/or y' are obtained as solutions of equation P*=P. For this purpose, in the absence of an algebraic relation providing modeled power P according to parameters x and/or y, or x' and/or y', any numerical method for searching a solution to an equation, for example, by successive iterations, may be implemented.

The switching times of the sequences are then calculated as described in relation with FIGS. 6A to 6D and 7A to 7D, from the obtained parameters x and/or y, or x' and/or y'. As a result, set point P* corresponds to the modeled value P.

In the second operating mode, due to the fact that value L is relatively high when current I135 is relatively low, a greater stored energy of the leakage inductance than if value L is constant is obtained for a same value of current I135. This enables to decrease current threshold $I_{ZVS}$ (beyond which the conditions for the switchings to be of ZVS are ensured). The duration of periods 830 and 832 (FIG. 11A) is thus decreased. This advantageously results in a decrease in energy losses in the converter in average during each halfwave of voltage V1.

Also in the second operating mode, due to the fact that value L is relatively high when current I135 is relatively low, the power transferred by the converter is lower for a given frequency than if value L is constant. This results in an improvement of the converter operation for relatively low powers. In particular, value Pmin (FIG. 11A) is decreased, which enables to decrease the duration of period 852 (FIG. 11A), and thus to improve the PFC function of the converter.

In the first operating mode, due to the fact that value L is relatively high when current I135 is relatively low, for a same value of the energy stored in the leakage inductance, a lower value of current I135 than if value L is constant is obtained. This enables to decrease current threshold $I_{ZVS}$ and thus to decrease the duration of periods 830 and 832 (FIG. 11A). This advantageously results in a decrease in energy losses in the converter in average during each halfwave of voltage V1.

Also in the first operating mode, due to the fact that value L is relatively high when current I135 is relatively low, the power transferred by the converter is higher for a given frequency than if value L is constant. This results in an improvement of the converter operation for relatively high powers. In particular, value Pmax (FIG. 11A) is increased, which enables to decrease the duration of period 854 (FIG. 11A), and thus to improve the PFC function of the converter.

Various embodiments and variants have been described. Those skilled in the art will understand that certain features of these embodiments can be combined and other variants will readily occur to those skilled in the art.

Finally, the practical implementation of the described embodiments and variants is within the abilities of those skilled in the art based on the functional indications given hereabove.

What is claimed is:

1. Method of controlling a converter comprising two H bridges coupled by a transformer, the method comprising:
respectively applying two switching sequences to the two bridges, wherein each of the two switching sequences comprise switchings between a plurality of states;
wherein one state of a first sequence of the two sequences corresponds to a given direction of application of a voltage to the transformer by a bridge having the first sequence applied thereto;
wherein the first sequence varies during a same halfwave of an AC voltage across one of the bridges, so that:
during at least a first time period, switchings into and out of said state of the first sequence occur in a same state of a second sequence of the two sequences; and during at least a second time period, switchings into and out of said state of the first sequence occur in different states of the second sequence;

wherein the switchings of the two sequences occur at times resulting from calculations based on an equality between: a power to be transferred between the bridges by the converter, represented by a set point and a power calculated from a model of the converter and from values of voltages across the bridges;

wherein, during the first time period, the set point is smaller than a maximum value of transferrable power estimated according to a value representative of a first duration between switching times of the two sequences;

wherein, during the second time period, the set point is greater than a minimum value of the transferrable power estimated according to a value representative of a second duration between switching times of the two sequences; and wherein transitions from the first period to the second period, from the second period to the first period, or from the first period to the second period and from the second period to the first period, are started by crossing by the set point, respectively, of the maximum value, the minimum value, or of the maximum and of the minimum value.

2. Method according to claim 1, wherein:

the two sequences each comprise two respective switching cycles for two branches of a bridge having the sequence applied thereto;

the cycles of a first one of the two sequences are phase-shifted with respect to each other; and the cycles of a second one of the two sequences are inverse to each other.

3. Method according to claim 1, wherein each of said switchings comprises a dead time, and said calculations are based, during at least central portions of the first and second periods, on a desired value of current in the transformer at one of the switchings being greater than a current threshold, so that the switchings are of ZVS type during said central portions.

4. Method according to claim 1, wherein the set point is calculated according to a value of a voltage received by one of the bridges and to a value of a voltage to be supplied by another one of the bridges.

5. Method according to claim 4, wherein the received voltage is an AC voltage and the set point is calculated so that the converter has a PFC-type operation.

6. Method according to claim 1, wherein said calculations are further based on a desired equality between values of a current in the transformer at one of the switchings of one of the two sequences and at one of the switchings of another one of the two sequences.

7. Method according to claim 1, wherein, for each of said calculations, a frequency common to said repetitions is selected prior to said calculation.

8. Method according to claim 1, wherein, during at least one third period astride the first and second periods and located outside of central portions of the first and second periods, said calculations are independent from a current threshold.

9. Method according to claim 1, wherein the two sequences are generated from a same value representative of an interval between switching times of the two sequences:

when a ratio between voltages across the two bridges is greater than a transformation ratio of the transformer; and when the ratio between the voltages is smaller than the transformation ratio.

10. Method according to claim 1, wherein the bridges are respectively switched:

according to the first and second ones of the two sequences when a ratio between respective voltages of the bridges is greater than a transformation ratio of the transformer; and according to the second and first ones of the two sequences when the ratio between respective voltages of the bridges is greater than the transformation ratio.

11. Device configured to implement a method according to claim 1.

12. The converter comprising a device according to claim 11.

13. Converter according to claim 12, wherein the transformer comprises a leakage inductance having its value decreasing when a current in the transformer increases in absolute value.

14. Method according to claim 1, wherein the cycles of the first and second one of the two sequences have a duty cycle substantially equal to 0.5.

15. Method according to claim 1, wherein the cycles of the first or second one of the two sequences have a duty cycle substantially equal to 0.5.

16. Method according to claim 1, wherein the set point is calculated according to a value of the voltage received by one of the bridges or to a value of the voltage to be supplied by the other one of the bridges.

* * * * *